(12) United States Patent
Sato et al.

(10) Patent No.: US 8,489,703 B2
(45) Date of Patent: Jul. 16, 2013

(54) ANALYSIS SYSTEM AND ANALYSIS SERVER

(75) Inventors: Nobuo Sato, Saitama (JP); Satomi Tsuji, Kokubunji (JP); Kazuo Yano, Hino (JP); Norihiko Moriwaki, Hino (JP); Norio Ohkubo, Tokyo (JP); Yoshihiro Wakisaka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 945 days.

(21) Appl. No.: 12/320,245

(22) Filed: Jan. 22, 2009

(65) Prior Publication Data

US 2009/0198475 A1 Aug. 6, 2009

(30) Foreign Application Priority Data

Feb. 1, 2008 (JP) .................................. 2008-022896

(51) Int. Cl.
*G06F 15/173* (2006.01)
*G06F 15/16* (2006.01)

(52) U.S. Cl.
USPC ............ 709/217; 709/218; 709/219; 709/246

(58) Field of Classification Search
USPC ........................... 709/217–219, 246; 600/300
See application file for complete search history.

(56) References Cited

U.S. PATENT DOCUMENTS

| | | | | |
|---|---|---|---|---|
| 6,416,471 B1* | 7/2002 | Kumar et al. | ................ | 600/300 |
| 6,975,629 B2* | 12/2005 | Welin | ............................ | 370/392 |
| 2004/0122702 A1* | 6/2004 | Sabol et al. | ...................... | 705/2 |
| 2005/0080322 A1* | 4/2005 | Korman | ........................ | 600/300 |
| 2007/0067005 A1* | 3/2007 | Schatz et al. | .................... | 607/59 |
| 2007/0150016 A1* | 6/2007 | Casset | ............................ | 607/18 |
| 2008/0183525 A1 | 7/2008 | Tsuji et al. | | |
| 2008/0215970 A1 | 9/2008 | Tsuji et al. | | |
| 2009/0062671 A1* | 3/2009 | Brockway et al. | ............ | 600/518 |
| 2009/0289799 A1* | 11/2009 | Tivig et al. | ................ | 340/573.1 |
| 2010/0261977 A1* | 10/2010 | Seely | ............................ | 600/300 |

FOREIGN PATENT DOCUMENTS

| | | |
|---|---|---|
| JP | 2002-300965 | 4/2001 |
| JP | 2004-170397 | 10/2003 |
| JP | 2007-206037 | 2/2006 |

* cited by examiner

*Primary Examiner* — Shirley Zhang
(74) *Attorney, Agent, or Firm* — Stites & Harbison, PLLC; Juan Carlos A. Marquez

(57) ABSTRACT

An analysis sever capable of performing analysis among a large amount of sensor data in order to obtain an analysis result that a reader desires and outputting the result instantaneously. The analysis server rearranges the sensor data acquired from a sensor node into time series data. The analysis is performed separately for time trigger analysis (D) and for event trigger analysis (F) depending on analysis contents. In the time trigger analysis (D), analysis processing that is basically needed when visualizing a state of an organization is performed. In the event trigger analysis (F), an analysis result obtained by the time trigger analysis (D) is processed using the reader's desired information and is outputted.

18 Claims, 12 Drawing Sheets

ANALYSIS SYSTEM AND ANALYSIS SERVER

CLAIM OF PRIORITY

The present application claims priority from Japanese patent application JP 2008-022896 filed on Feb. 1, 2008, the content of which is hereby incorporated by reference into this application.

FIELD OF THE INVENTION

The present invention relates to an analysis technology of a large amount of sensor signals that instantaneously outputs an analysis result that a reader desires by performing the analysis on a large amount of sensor data to obtain the result in a business microscope system that acquires communication data of persons and visualizes a state of an organization.

BACKGROUND OF THE INVENTION

Conventionally, as a method for outputting an analysis result promptly, there was a method for performing analysis processing in advance (for example, see JP-A-2002-300965, JP-A-2004-170397, and JP-A-2007-206037).

SUMMARY OF THE INVENTION

In every organization, improvement in productivity has been an indispensable problem and many trials and errors have been conducted for improvement of workplace environments and efficiency improvement of businesses. When the organizations are limited to organizations whose businesses are assembly or conveyance in factories etc., their results can be analyzed objectively by tracing parts or products along their moving paths. However, regarding a white-collar organization that performs knowledge labor, such as administration, sales, and planning, since real things is not directly connected with businesses, the organization cannot be estimated by observing the real things. First of all, a reason for constituting the organization attains a large-scale business that cannot be handled by an individual, by cooperating powers of plural people. For this reason, in any organizations, decision making and agreement are always made by two or more persons. It can be considered that these decision making and agreement are affected by a relationship property between persons, and success or failure of them may be determinant of productivity. Here, the relationship property may be labeling of, for example, a boss, a subordinate, and a friend, and further it may include various emotions to one another, such as good will, dislike, reliance, and influence. In order that a person has the relationship property with another person, mutual understanding, i.e., communication, is indispensable. For this reason, it is considered that the relationship property can be investigated by acquiring a record of communication.

One method for detecting this communication between persons utilizes a sensor network. The sensor network is a technique where a terminal equipped with a sensor and a wireless communication circuit is installed to an environment, a real thing, a person, etc., various pieces of information obtained from the sensor is taken out via a radio wave, and whereby the information is applied for acquisition and control of a state. Physical quantities acquired by the sensor in order to detect this communication include an infrared ray for detecting a face-to-face state, voices for detecting talks and an environment, acceleration for detecting movement of a person.

A system that detects movements of persons and communications between persons from physical quantities obtained from these sensors, visualizes a state of the organization, and thereby uses it to improve the organization is a business microscope system.

Although, regarding sensor data obtained in the business microscope system, the amount of data acquired at one time is a small amount, if the system becomes a large scale (the number of participants increases), the data quantity becomes huge. Then, in order to visualize a state of the organization, the large amount of the sensor data is used for processing, which will lengthen a processing time.

Outputting the analysis result instantaneously when a reader wishes to see is important in terms of interface. As one of solutions, what is necessary performs analysis processing in advance. As disclosed in the above-mentioned patent documents, JP-A-2002-300965, JP-A-2004-170397, and JP-A-2007-206037, performing the fixed analysis (routine analysis) in advance enables the reader to read a visualization result without feeling a stress of waiting the analysis result.

However, since the method described by the above-mentioned conventional technology is limited to output a non-diversity and fixed result, the reader cannot request what is not included in the fixed result.

As a measure against it, it is considered that the sensor data is rearranged in the time order and the analysis is divided according to its type.

The former copes with a fact that a reverse of time occurs even when the data is transmitted in the time order as being sensed because a transmission/reception time may vary largely due to a crosswalk in the network in wireless communication between a sensor node and a base station, which is a characteristic problem of the sensor net. As a result of this inversion, the sensor data stored in the sensor data collection is not in the time order. Since the analysis is performed in the chronological order, the sensor data must be ordered in the chronological order. Further, since rearranging of all pieces of a large amount of the sensor data needs a time, the amount of rearranging must be reduced by as much as possible.

The latter has two analysis methods as a method of analysis. One is event trigger type analysis. This implies a processing of starting the analysis after receiving a request of the reader. This has an advantage of capability of dealing with the reader's request. As a fault, this takes a time for outputting since the processing is started after receiving the request. Another is time trigger analysis. This is a processing of performing analysis for a certain duration at every fixed time (periodically). As an advantage, since the analysis processing is performed in advance, the analysis processing has been finished when the reader makes a request, and consequently it does not take a time to start outputting. However, since this means to conduct the fixed analysis processing, this analysis does not necessarily cope with the reader's desire. When processing a small amount of the sensor data, since the number of times of analysis is fewer, even the event trigger type analysis can output the result instantaneously; however, when processing a large amount of the sensor data, it will take a time for the processing. Moreover, if the time trigger analysis is performed, it can instantaneously output the result regardless of the quantity of data signals. However, it cannot reflect the desire of individual readers.

The problem of the present invention provides an analysis system capable of instantaneously outputting a result even when analysis is performed on a large amount of the sensor data in order to obtain an analysis result that the reader desires.

One representative example of the present invention will be shown as follows. That is, the analysis system of the present invention is an analysis system that uses the sensor node and a server that are mutually connected via the network, and analyzes the sensor data sensed by the sensor node, wherein the sensor node and the server have each a send/receive unit, a memory unit, and a control unit, the memory unit of the server stores the sensor data received via the network, the control unit of the server rearranges the sensor data in the chronological order of sensing when the sensor data that arrived later has an earlier order than the sensor data that arrived earlier so that the sensor data sensed earlier may take an earlier order than the sensor data sensed later, and stores it in the memory unit, and the server performs the analysis related to the sensor data using the sensor data that was rearranged in the chronological order of the sensing and outputs the performed result.

Moreover, the analysis system of the present invention is an analysis system that analyzes the sensor data sensed by the sensor node using the sensor node and the server that are mutually connected via the network, wherein the sensor node and the server have each the send/receive unit, the memory unit, and the control unit, and the server selectively performs at least one of event trigger analysis that performs analysis on the sensor data received via the network in conformity to the input conditions using the event trigger as a trigger according to the event input and time trigger analysis that performs analysis at every predetermined time.

Moreover, the analysis server of the present invention is an analysis serer that is connected with the sensor node via the network and is constructed by having the send/receive unit, the memory unit, and the control unit, wherein the control unit is configured to store the sensor data received via the network, to rearrange the sensor data in the chronological order of the sensing so that the sensor data sensed earlier may take an earlier order than the sensor data sensed later when the sensor data that arrived later has an earlier order of being sensed than the sensor data that arrived earlier, and to store it into the memory unit, and performs the analysis related to the sensor data using the sensor data that was rearranged in the chronological order of the sensing.

According to the present invention, even if the data is a large amount of the sensor data, it becomes possible to instantaneously provide a visualization result to the reader.

DETAILED DESCRIPTION OF THE PREFERRED EMBODIMENT

Figure 1A:
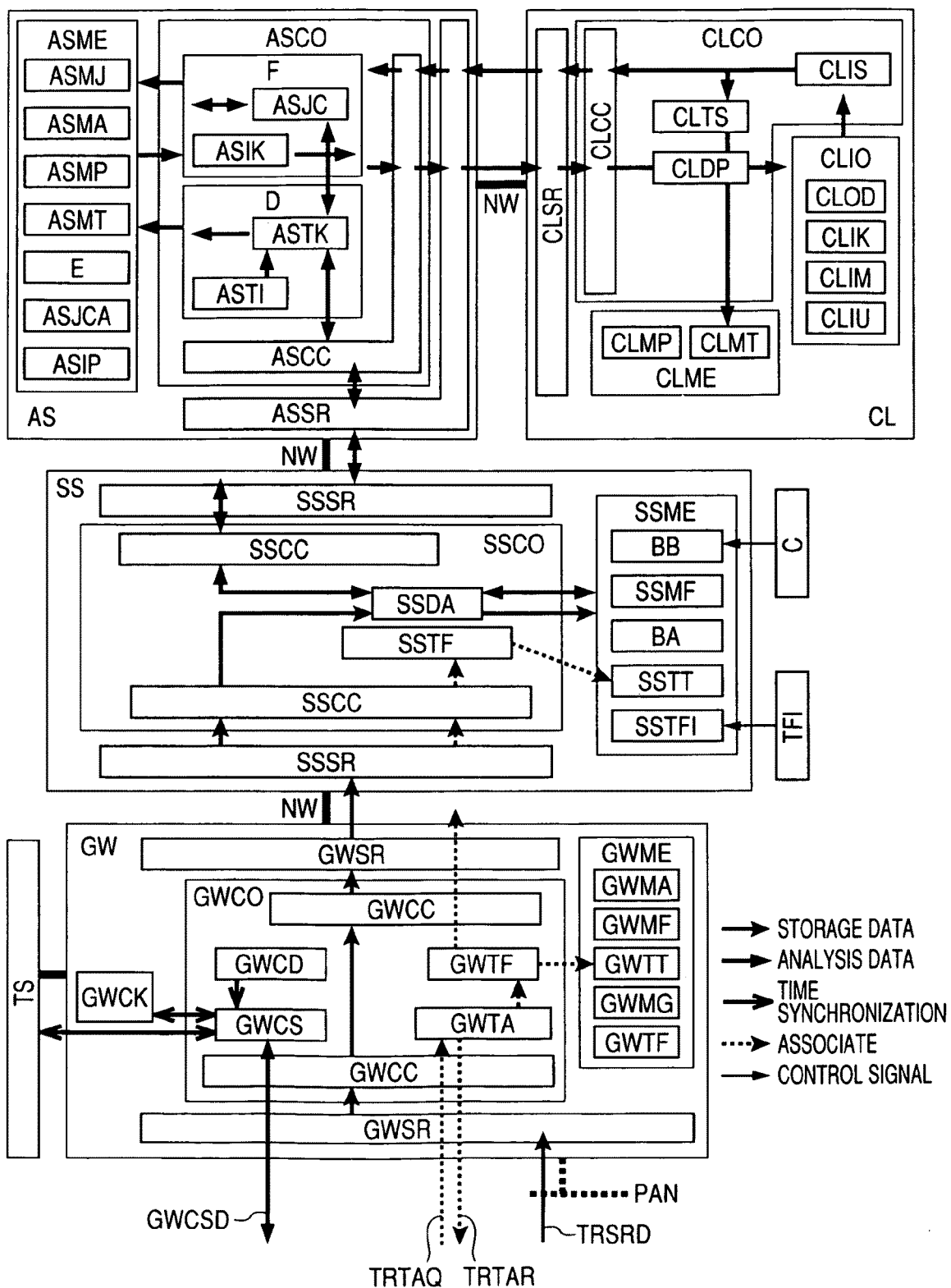
FIG. 1A and FIG. 1B are explanatory diagrams showing components of the business microscope system of the first embodiment.

An analysis system of the present invention is an analysis system for analyzing sensor data sensed by a sensor node, using the sensor node and a server that are mutually connected via a network. The sensor node and the server have each a send/receive unit, a memory unit, and a control unit. The memory unit of the server stores the sensor data received via the network. The control unit of the server rearranges the sensor data in the chronological order of the sensing when the sensor data that arrived later has an earlier order of the sensing than the sensor data that arrived earlier so that the sensor data sensed earlier may take an earlier order than the sensor data sensed later, and stores it into the memory unit. Using the sensor data that was rearranged in the chronological order of the sensing, the server performs the analysis related to the sensor data and outputs a performed result.

The analysis system may be configured to further have a base station that is connected to the sensor node and the server via the network. In that case, the base station can be so configured that it may be equipped with the send/receive unit, the memory unit, and the control unit, and the sensor node may transmit the sensor data to the base station, for example, when being located in a possible range of wireless communication with the base station via the send/receive unit, and may store the sensor data into the memory unit of the sensor node when not being located in the possible range of wireless communication. In this case, the server receives the sensor data via the base station.

The control unit of the server may be configured to specify a range of the sensor data that are considered as an object of the rearranging with respect to the sensor data before being rearranged, when rearranging the sensor data in the chronological order of the sensing.

The analysis includes time trigger analysis in which the sensor data is analyzed at every predetermined time and event trigger type analysis in which analysis is performed using an event input as a trigger and according to the event input. The control unit of the server switches between the time trigger analysis and the event trigger type analysis according to input conditions inputted into the server.

The control unit of the server can be able to find tendency of the place that is being sensed by the sensor node by analyzing the sensor data using an index.

Moreover, the control unit of the server can be configured to correct a center position of the amplitude of the sensor data using a low pass filter.

The server may be configured to calculate a histogram of the sensor data as a feature quantity indicating tendency of the sensor data in a predetermined time.

The analysis system of the present invention may be so configured that the server selectively performs at least one of the event trigger type analysis in which the even input is used as a trigger and the analysis is performed depending on the even input and the time trigger analysis for performing the analysis at every predetermined time both on the sensor data received via the network according to the input conditions.

In that case, the analysis system may be configured by further having a base station that is connected with the sensor node and the server via the network, which is the same as the above mentioned. That is, the base station has the send/receive unit, the memory unit, and the control unit. The sensor node transmits the acquired sensor data to the base station when the base station is located in the possible range of wireless communication; the sensor node stores the acquired sensor data into the memory unit of the sensor node for the base station when the base station is not located in the possible range of wireless communication. Moreover, the server receives the sensor data via the base station.

The control unit of the server changes orders of the sensor data arrived earlier and the sensor data arrived later in the time trigger analysis, so that the sensor data is rearranged in the chronological order of the sensing.

The server performs the analysis on the sensor data that has been rearranged in the chronological order of the sensing as the object in the event trigger type analysis.

The control unit of the server may be configured to specify the range of the sensor data that is considered as the object of rearranging with respect to the sensor data before being rearranged, when rearranging the sensor data in the chronological order of the sensing.

The analysis server of the present invention is an analysis server that is connected with the sensor node via the network and is constructed by having the send/receive unit, the memory unit, and the control unit. The memory unit is configured to store the sensor data received via the network. The control unit is configured to, when the sensor data that arrived later has an earlier order of being sensed than the sensor data that arrived earlier, rearrange the sensor data in the chronological order of the sensing so that the sensor data sensed earlier may take an earlier order than the sensor data sensed later and to store it into the memory unit. Then, the analysis server performs the analysis related to the sensor data using the sensor data that was rearranged in the chronological order of the sensing.

In this case, the system can be configured that, when rearranging the sensor data in the chronological order of the sensing, the range of the sensor data that is considered as the object of rearranging with respect to the sensor data before being rearranged.

The analysis includes the time trigger analysis and the event trigger type analysis. Therefore, the control unit will switch between the time trigger analysis and the event trigger type analysis according to the input conditions inputted into the analysis server.

Moreover, the control unit can be configured to be able to find tendency of a place that is being sensed by the sensor node by analyzing the sensor data using the index.

Furthermore, the control unit may be configured to calculate a histogram of the sensor data as the feature quantity that indicates tendency of the sensor data in the predetermined time.

The analysis system and the analysis server of the present invention can be also applied to a case where the sensor node comprises plural unit sensor nodes. In that case, the analysis server receives the sensor data transmitted from the plural unit sensor nodes in arrival order, rearranges the sensor data, which was ordered in arrival order, in the chronological order of the sensing in the whole of the plural unit sensor nodes, and performs the analysis on the rearranged sensor nodes as the object.

Or conversely, the analysis system and the analysis server of the present invention can also be applied to a case where the sensor node comprise a single unit sensor node. In that case, the analysis server receives the sensor data transmitted from the single unit sensor node in arrival order, rearranges the sensor data, which was ordered in arrival order, in the chronological order of the sensing in the single unit sensor node, and performs the analysis on the rearranged sensor nodes as the object.

The system may be so configured that results obtained by performing the analysis may be stored into the memory unit as plural analysis result tables. In that case, the plural analysis result tables are stored being aligned in the chronological order that corresponds to a time series of the sensing of the sensor data related to the analysis. This configuration enables a desired analysis result to be promptly obtained by holding down a processing time spent in matching of plural analysis results.

In the present invention, in order to solve the above-mentioned problem, rearranging of the sensor data in the chronological order is performed as a pre-processing of the analysis. As the amount of sensor data becomes larger, it takes a longer time to rearrange the data in the chronological order. Then, if it is known in which part of the sensor data collection the pertinent sensor data is stored, the range is specified and rearranging within the range is performed, whereby it becomes possible to acquire the sensor data rearranged in the chronological order without using a time. In order to find the range, what is necessary is to grasp the number of transmissions of the sensor data per user.

Moreover, as an analysis method, the analysis is performed after dividing it into the time trigger analysis and the event trigger type analysis. In the time trigger analysis, analysis processing that forms a base and is needed when performing visualization is performed. Moreover, the event trigger type analysis processes and outputs an analysis result obtained by that the time trigger analysis using a desire of a reader. Further, the time trigger analysis is assigned to perform a processing that requires large amount of calculation. Therefore, since the event trigger type analysis performs the processing using the result, it takes a less time for the analysis processing. The event trigger type analysis refers to a time that was used in the analysis processing in the time trigger analysis. If data needed for the event trigger type analysis is unprocessed in the time trigger analysis, the event trigger type analysis issues a command to the time trigger analysis so that it may perform the processing.

Hereafter, the best forms for carrying out the present invention will be explained using the drawings, as each of embodiments below.

First Embodiment

In order to clarify significance and functions of the analysis system that is a first embodiment of the present invention, first, a business microscope system will be explained. Incidentally, the business microscope is a system in which a state of a person is observed by the sensor node installed to the person, the relationship property between persons and evaluation of a present organization (performance) are shown in the figure, as organization activity, which is intended to be used to improve the organization. The data about face-to-face detection, behaviors, sounds, etc. acquired by the sensor node are collectively called organization dynamics data broadly.

Figure 1B:
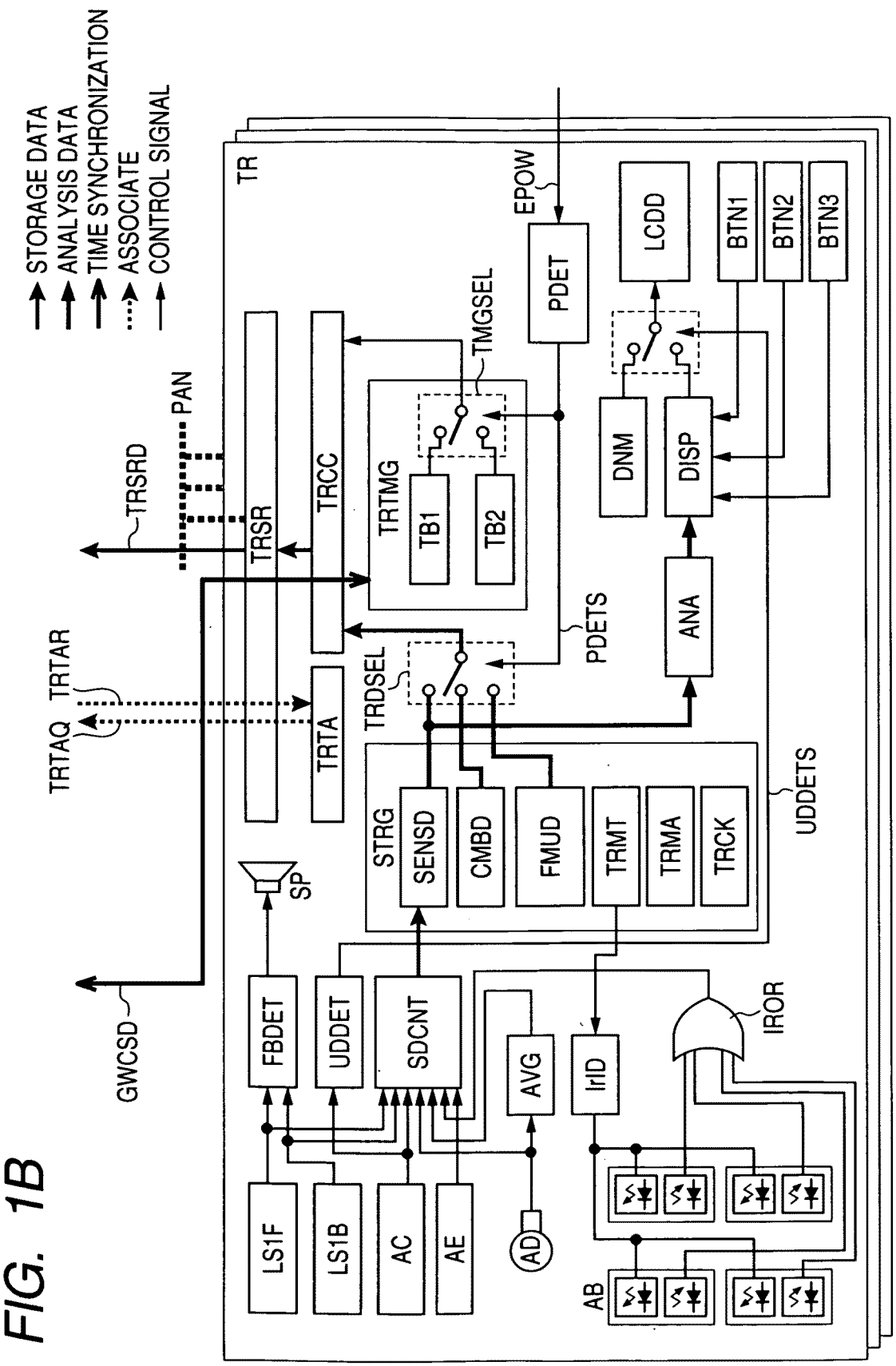

FIG. 1A and FIG. 1B are explanatory diagrams showing components of the business microscope system of this embodiment. Although the system is divided into the two figures for the convenience of illustration, processing shown in the figures are executed in a mutually coordinated manner. The figures show a succession of flow consisting of a terminal (sensor node) (TR) as the first component, a base station (GW) to pass through, a sensor net server (SS) for storing the organization dynamics data, an application server (AS) for functioning as the analysis server for analyzing the organization dynamics data, and a client (CL) for outputting an analysis result to the reader as the last.

This system comprises the terminal (sensor node) (TR), the base station (GW), the sensor net server (SS), the application server (AS), and the client (CL). Incidentally, the two servers, the sensor net server (SS) and the application server (AS) may be constructed with a single server (SAS) for storing the organization dynamics data and analyzing the organization dynamics data. In this case, it is needless to say that this server (SAS) functions as a server for analysis.

The base station (GW) shown in FIG. 1A has a role of mediating the terminal (sensor node) (TR) shown in FIG. 1B and the sensor net server (SS). In consideration of a range of radio, plural base stations (GW) are arranged so that domains of a sitting room, a work place, etc. may be covered.

The base station (GW) has a send/receive unit (GWSR), a memory unit (GWME), a clock (GWCK), and a control unit (GWCO).

The send/receive unit (GWSR) receives a radio signal from the terminal (sensor node) (TR), and performs transmission by wire or radio to the base station (GW). Further, the send/receive unit (GWSR) is equipped with an antenna for receiving radio waves.

The memory unit (GWME) is made up of a hard disk drive and a nonvolatile storage device, such as flash memory. The memory unit (GWME) stores at least movement setting (GWMA), data format information (GWMF), a terminal management table (GWTT), and base station information (GWMG). The movement setting (GWMA) includes information showing an operation method of the base station (GW). The data format information (GWMF) includes information showing a data format for communication and information needed to put a tag on sensing data. The terminal management table (GWTT) contains terminal information (TRMT) of the subordinate terminal (sensor node) (TR) that is being successfully associated currently and local ID distributed in order to control those terminals (sensor nodes) (TR's). The base station information (GWMG) includes information of the base station's (GW) own address, etc. Moreover, the memory unit (GWME) temporarily stores updated firmware (GWTF) of the terminal (sensor node).

The memory unit (GWME) may further store a program that is executed by a central processing unit CPU (illustration is omitted) in the control unit (GWCO).

The clock (GWCK) holds time stamp. The time stamp is updated at regular intervals. Concretely, the time stamp of the clock (GWCK) is corrected by the time stamp acquired from an NTP (Network Time Protocol) server (TS) at regular intervals.

The control unit (GWCO) is equipped with a CPU (illustration is omitted). By the CPU executing a program stored in the memory unit (GWME), the following are controlled: acquisition timing of sensing data sensor information, processing of the sensing data, transmission/reception timing to the terminal (sensor node) (TR) and the sensor net server (SS), and timing of time synchronization. Concretely, the CPU executes a program stored in the memory unit (GWME), whereby processings of a wireless communication control and communication control unit (GWCC), data format conversion (GWDF), associate (GWTA), time synchronization control (GWCD), time synchronization (GWCS), etc. are performed.

The wireless communication control and communication control unit (GWCC) controls timing of communication between the terminal (sensor node) (TR) and the sensor net server (SS) by wire or radio. Moreover, the wireless communication control and communication control unit (GWCC) discriminates the kind of received data. Concretely, the wireless communication control and communication control unit (GWCC) identifies the received data as to whether it is the general sensing data or data for associate or a answer to the time synchronization, etc. from a header part of the data, and transfers these pieces of data to respective proper functions.

Incidentally, the wireless communication control and communication control unit (GWCC) conducts the data format conversion (GWDF) in which the data is converted into a form suitable for transmission and reception by referring to data format information (GWMF) recorded in the memory unit (GWME) and tag information for indicating the kind of data is added thereto.

The associate (GWTA) transmits a answer (TRTAR) responding to an associate request (TRTAQ) sent from the terminal (sensor node) (TR), and transmits a local ID assigned to the each terminal (sensor node) (TR). When the associate is established, the associate (GWTA) corrects terminal control information using the terminal management table (GWTT) and the terminal firmware (GWTF).

The time synchronous control (GWCD) controls an interval and a timing with which the time synchronization is conducted, and issues a command so that the time synchronization may be done. Alternatively, the sensor net server (SS) may send a centralized command to the base stations (GW's) over the whole system by the sensor net server that will be explained later performing the time synchronization control (GWCD).

The time synchronization (GWCS) connects to an ntp server on the network and requests and acquires the time stamp. The time synchronization (GWCS) corrects the clock (GWCK) based on the acquired time stamp. Then, the time synchronization (GWCS) transmits a command of the time synchronization and the time stamp (GWCD) to the terminal (sensor node) (TR).

The sensor net server (SS) shown in FIG. 1A manages data gathering from all the terminal (sensor node)s (TR). Concretely, the sensor net server (SS) stores data sent from the base station (GW) into the database, and transmits the sensing data based on a request from the application server (AS) and the client (CL). Further, the sensor net server (SS) receives a control command from the base station (GW), and sends back a result obtained from the control command to the base station (GW).

The sensor net server (SS) is equipped with a send/receive unit (SSSR), a memory unit (SSME), and a control unit (SSCO). When the sensor net server (SS) conducts the time synchronous control (GWCD), the sensor net server (SS) also needs a clock.

The send/receive unit (SSSR) transmits and receives data between itself and the base station (GW), the application server (AS), and the client (CL). Concretely, the send/receive unit (SSSR) receives the sensing data sent from the base station (GW), and transmits the sensing data to the application server (AS) or the client (CL).

The memory unit (SSME) is made up of a hard disk drive and a nonvolatile storage device, such as flash memory, and stores at least a performance table (BB), data format information (SSMF), a data table (BA), and a terminal management table (SSTT). Further, the memory unit (SSME) may store a program that will be executed by a CPU (illustration is omitted) of the control unit (SSCO). Further, the memory unit (SSME) temporarily stores updated firmware (SSTFI) of the terminal (sensor node) stored in a terminal firmware registration unit (TFI).

The performance table (BB) is a database for recording evaluation (performance) about the organization or individuals inputted from the terminal (sensor node) (TR) or from existing data together with time data. The performance table (BB) is the same as the performance table (BB) of FIG. 2A.

The data format information (SSMF) records the data format for communication, a method for dividing the sensing data given a tag at the base station (GW) and recording them in the database, a method for dealing with a request of data, etc. As will be explained later, after data reception and before data transmission, a communication control unit (SSCC) surely refers to this data format information (SSMF) and performs data format conversion (SSMF) and data management (SSDA).

The data table (BA) is a database for recording the sensing data acquired by the each terminal (sensor node) (TR), information on the terminal (sensor node) (TR), information on the base station (GW) through which the sensing data transmitted by the each terminal (sensor node) (TR) passed, etc. A column is formed for each element of data, such as acceleration, temperature, etc. and the data is managed. Alternatively, a table may be formed for each element of the data. In either case, all the data is managed in such a way that the acquired terminal information (TRMT), which is an ID of the terminal (sensor node) (TR), and information about the acquired time are associated with each other.

The terminal management table (SSTT) is a table for recording which terminal (sensor node) (TR) is under control of which base station (GW) now. When the terminal (sensor node) (TR) is newly added under control of the base station (GW), the terminal management table (SSTT) will be updated.

The control unit (SSCO) is equipped with a central processing unit CPU (illustration is omitted), and controls transmission/reception of the sensor data and recording to/extraction from a database. Concretely, by the CPU executing a program stored in the memory unit (SSME), the control unit (SSCO) performs processing of the communication control (SSCC), terminal management control adjustment (SSTF), the data management (SSDA), etc.

The communication control unit (SSCC) controls timings of communications with the base station (GW), the application server (AS), and the client (CL) by wire or radio. Moreover, as described above, the communication control (SSCC) converts a format of data that is transmitted/received into a data format in the sensor net server (SS) or a data format that is specialized for each communication talking partner based on the data format information (SSMF) recorded in the memory unit (SSME). Further, the communication control (SSCC) reads a header part indicating a kind of the data, and distributes the data to a corresponding processing unit. Concretely, the received data is distributed to the data management (SSDA), and a command to correct the terminal control information is distributed to the terminal control information correction (SSTF). The address of the transmitted data is decided by the base station (GW), the application server (AS), or the client (CL).

When the terminal control information correction (SSTF) receives a command to correct the terminal control information from the base station (GW), it will update the terminal management table (SSTT).

The data management (SSDA) manages correction, acquisition, and addition of the data in the memory unit (SSME). For example, the sensing data is recorded in a suitable column of the database according to data elements based on tag information by the data management (SSDA). Also when the sensing data is read from the database, processings of selecting needed data based on the time stamp and the terminal information, rearranging them in the time order, and the like will be performed.

That the sensor net server (SS) records the data received via the base station (GW) by the data management (SSDA) in the performance table (BB) and the data table (BA) after ordering it corresponds to organization dynamics data collection (B) in FIG. 1A.

The application server (AS) shown in FIG. 1A analyzes and processes the sensing data. Upon receipt of a request from the client (CL), or automatically at a setting time, the analysis application is activated. The analysis application sends a request to the sensor net server (SS) to acquire the needed sensing data. Further, the analysis application analyzes the acquired data and sends back the analyzed data to the client (CL). Alternatively, the analysis application may record and save the analyzed data in the analysis database as it is.

The application server (AS) is equipped with a send/receive unit (ASSR), a memory unit (ASME), and a control unit (ASCO).

The send/receive unit (ASSR) transmits and receives data among itself, the sensor net server (SS), and the client (CL). Concretely, the send/receive unit (ASSR) receives a command sent from the client (CL), and transmits a data acquisition request to the sensor net server (SS). Further, the send/receive unit (ASSR) receives the sensing data from the sensor net server (SS) and transmits the data that was analyzed to the client (CL).

The memory unit (ASME) is made up of a hard disk drive and an external storage device such as memory and an SD card. The memory unit (ASME) stores setting conditions for the analysis and the analyzed data. Concretely, the memory unit (ASME) stores analysis conditions (ASMJ), analysis algorithm (ASMA), analysis parameter (ASMP), terminal user (ASMT), an analysis result database (E), an analysis finish range table (ASJCA), and a general information table (ASIP).

Regarding the analysis conditions (ASMJ), the analysis conditions for the display requested from the client (CL) are temporarily stored.

The analysis algorithm (ASMA) records a program for performing the analysis. In accordance with a request from the client (CL), an appropriate program is selected and the analysis is performed by the program.

The analysis parameter (ASMP) records, for example, a parameter for feature quantity extraction, etc. When changing the parameter by a request of the client (CL), the analysis parameter (ASMP) is rewritten.

The terminal information-name (ASMT) is a comparative table of a terminal ID versus name, attributes, etc. of a person who wears the terminal. If there is a request from the client (CL), the name of the person is added to the terminal ID of data received from the sensor net server (SS). When acquiring only data of persons who suit a certain attribute, in order to convert designation of the persons into terminal ID's and transmit the data acquisition request to the sensor net server (SS), the terminal information-name (ASMT) is referred to.

The analysis result database (E) is a database for storing data analyzed by a time trigger analysis unit (D).

The analysis finish range table (ASJCA) describes a range analyzed by time trigger analysis (D) and a time used for the processing.

The general information table (ASIP) is a table that is used as the index when performing the time trigger analysis (D) and event trigger analysis (F). This index can be used to find tendency of a place that is being sensed, by being used in the analysis together with the sensor data.

The control unit (ASCO) is equipped with a central processing unit CPU (illustration is omitted), and performs control of transmission and reception of the data and the analysis of the sensing data. Concretely, the CPU (illustration is omitted) executes a program stored in the memory unit (ASME), whereby communication control (ASCC), the time trigger analysis (D), and the event trigger analysis (F) are performed.

The communication control (ASCC) controls the timing of communication with the sensor net server (SS) and the client data (CL) by wire or radio. Further, the communication control (ASCC) performs format conversion of the data and distribution of the data to a destination according to the kind of the data.

The time trigger analysis (D) is activated by a timer (ASTI) to perform time analysis (ASTK). Contents to analyze are described in the analysis algorithm (ASMA). The analyzed result is stored in the analysis result database (E), and the analysis finish range table (ASJCA) showing the range that was analyzed is updated.

In the event trigger analysis (F), analysis condition setting (CLIS) that is the desired information of the reader is transmitted to the application server (AS), which performs the analysis based on its contents. Analysis time range check (ASJC) checks a time needed for the analysis from the analysis condition setting (CLIS). It is determined whether the processing can be done only with the data of the analysis result database (E) by comparison with the analysis finish range table (ASJCA). If it is impossible to perform the analysis only with the contents of the analysis result database (E) due to insufficiency of the data, a command to perform the analysis will be issued to the time trigger analysis (D). When data needed for the analysis gathers in the analysis result database (E), event analysis (ASIK) will be performed. A result processed by this is transmitted to the client (CL).

The client (CL) shown in FIG. 1A serves as a contact point with a user (US), and allows the data to output and input. The client (CL) is equipped with an input-output unit (CLIO), a send/receive unit (CLSR), a memory unit (CLME), and a control unit (CLCO).

The input-output unit (CLIO) is a part that serves as an interface with the user (US). The input-output unit (CLIO) is equipped with a display (CLOD), a keyboard (CLIK), a mouse (CLIM), etc. Other input-output devices can also be connected with its external input-output (CLIU) as necessary.

The display (CLOD) is an image display device, such as a CRT (Cathode Ray Tube) or a liquid crystal display. The display (CLOD) may include a printer etc.

The send/receive unit (CLSR) transmits and receives data between itself and the application server (AS) or the sensor net server (SS). Concretely, the send/receive unit (CLSR) transmits the analysis conditions according to the input condition from the user to the application server (AS), and receives an analysis result.

The memory unit (CLME) is made up of an outer recording apparatus, such as a hard disk drive, memory, and an SD card. The memory unit (CLME) records information needed for drawing, such as the analysis conditions (CLMP) and drawing setting information (CLMT). The analysis conditions (CLMP) record conditions of the number of members that are analysis objects being set by the user (US), a selection of an analysis method, etc. The drawing setting information (CLMT) records information about a drawing position as to what is plotted, and at which part of the drawing it is done. Further, the memory unit (CLME) may store a program that will be executed by a CPU (illustration is omitted) of the control unit (CLCO).

The control unit (CLCO) is equipped with a CPU (illustration is omitted), and performs control of communication, inputting of the analysis conditions from the user (US), drawing of the analysis result to show it to the user (US), etc. Concretely, the CPU performs processings of communication control (CLCC), the analysis condition setting (CLIS), and draw setting (CLTS) by executing a program stored in the memory unit (CLME).

The communication control (CLCC) controls a timing of communication between the CPU and the application server (AS) or sensor net server (SS) by wire or radio. Moreover, the communication control (CLCC) changes the format of data and distributes it to a destination according to the kind of the data.

The analysis condition setting (CLIS) receives the analysis conditions specified by the user (US) via the input-output unit (CLIO), and records it in the analysis conditions (CLMP) of the memory unit (CLME). In this unit, a period of the data used in the analysis, a member, the kind of the analysis, parameters of the analysis, etc. are set up. The client (CL) transmits these settings to the application server (AS), requests the analysis, and performs the drawing setting (CLTS) in parallel with it.

The drawing setting (CLTS) calculates a method for displaying the analysis result based on the analysis conditions (CLMP) and a position at which a drawing is plotted. The result of this processing is recorded in the drawing setting information (CLMT) of the memory unit (CLME).

Display (CLDP) creates a drawing and a table by plotting the analysis result acquired from the application server (AS). As an example, the display (CLDP) plots a display like a radar chart, a time series graph, and a scatter diagram graph. At this time, if necessary, the display (CLDP) also displays the attributes, such as a person's name currently displayed. The created display result is presented to the user (US) via an output device, such as the display (CLOD). The user (US) can also fine-tune a display position by an operation of drag & drop etc.

FIG. 1B shows a configuration of the terminal (sensor node) (TR) that is one example of the sensor node. The terminal (sensor node) (TR) is mounted by various sensors as follows: plural infrared ray send/receive devices (AB) for detecting a face-to-face state of persons, a triaxial acceleration sensor (AC) for detecting a movement of the wearer, a microphone (AD) for detecting utterance of the wearer and surrounding sounds, illuminance sensors (LS1F, LS1B) for detecting the front and back sides of the terminal (sensor node), and a temperature sensor (AE). The mounted sensors are of an example, and other sensor may be used in order to detect the face-to-face state and movements of the wearer.

In this embodiment, the sensor node is mounted by four sets of the infrared ray send/receive devices. The infrared ray send/receive device (AB) continues periodically transmitting the terminal information (TRMT) that is unique identification information of the terminal (sensor node) (TR) toward a front direction. When a person wearing the other terminal (sensor node) (TR) is located approximately in front (for example, front or obliquely front), the one terminal (sensor node) (TR) and the other terminal (sensor node) (TR) exchange the respective terminal information (TRMT) mutually by an infrared ray. Consequently, the system can record who faces whom.

Generally, each infrared ray send/receive device is constructed with a combination of an infrared ray emitting diode for infrared ray sending and an infrared ray phototransistor. An infrared ray ID send/receive unit (IrID) creates the terminal information (TRMT) that is its own ID and transmits it to the infrared ray emitting diode of an infrared ray send/receive module. In this embodiment, the same data is transmitted to plural infrared ray send/receive module, and thereby all the infrared ray emitting diodes are turned on simultaneously. Naturally, independent data may be outputted at independent timings, respectively.

Moreover, the data received by the infrared ray phototransistor of the infrared ray send/receive device (AB) is put into calculation of an OR (logical sum) by an OR circuit (IROR). That is, if light of an ID is received by at least one infrared ray receive unit, it will be recognized as the ID by the terminal (sensor node). Naturally, the infrared ray send/receive device (AB) may be configured to have plural reception circuits of ID. In this case, since a transmission/reception state can be grasped for the each infrared ray send/receive module, the system can also acquire additional information, for example, in which direction the other terminal (sensor node) that the one sensor node faces is located, and the like.

Sensor data (SENSD) detected by the sensor is stored in a memory unit (STRG) by a sensor data storage control unit (SDCNT). The sensor data (SENSD) is processed into a transmission packet by a wireless communication control unit (TRCC), and the packet is transmitted to the base station (GW) by a send/receive unit (TRSR).

At this time, what extracts the sensor data (SENSD) from the memory unit (STRG) and creates a timing to perform wireless transmission is a communication timing control unit (TRTMG) The communication timing control unit (TRTMG) has plural time base for creating plural timings.

Data stored in the memory unit includes collective sending data (CMBD) accumulated in the past and firmware update data (FMUD) to update firmware that is an operation program of the terminal (sensor node), in addition to the sensor data (SENSD) detected by a current sensor.

Figure 2A:
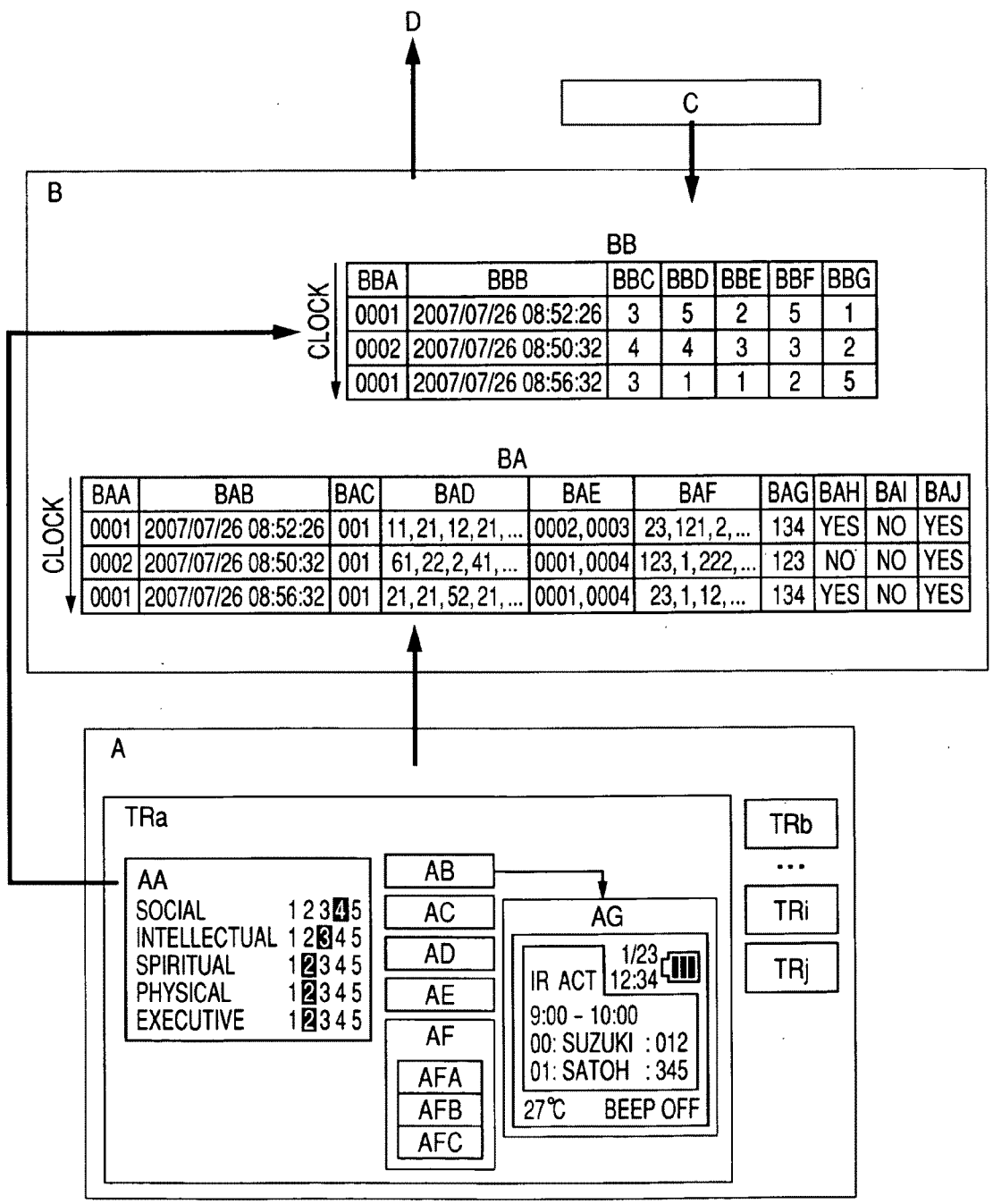
FIG. 2A is a schematic diagram (No. 1) of the whole of the first embodiment.

The terminal (sensor node) (TR) of this embodiment detects that an external power (EPOW) is connected by an external power connection detection circuit (PDET), and generates an external power detection signal (PDETS). A time base switching unit (TMGSEL) that switches the send timing generated by the timing control unit (TRTMG) using the external power detection signal (PDETS), or a data switching unit (TRDSEL) for switching the data that is wireless communicated is a specific configuration of this embodiment. FIG. 2A, as one example, shows in the figure a configuration where, regarding the transmission timing, the time base switching unit (TMGSEL) switches two time bases, time base 1 (TB1) and time base 2 (TB2), in response to the external power detection signal (PDETS) and also shows in the figure a configuration where, regarding the data to be communicated, the data switching unit (TRDSEL) switches among the sensor data obtained from the sensor and the collective sending data (CMBD) accumulated in the past, and the firmware update data (FMUD) according to the external power detection signal (PDETS).

The illuminance sensors (LS1F, LS1B) are mounted on the front and the back of the each terminal (sensor node) (TR). The data acquired by the illuminance sensors (LS1F, LS1B) is stored into the memory unit (STRG) by the sensor data storage control unit (SDCNT), and is used for comparison by a turn-over detection unit (FBDET). When the nameplate is correctly installed, the illuminance sensor (LS1F) mounted on the front of the nameplate receives external light, while the illuminance sensor (LS1B) installed on the back takes a position sandwiched between the body of the terminal (sensor node) and the wearer, it does not receive external light. At this time, an illuminance detected by the illuminance sensor (LS1F) takes a larger value than an illuminance detected by the illuminance sensor (LS1B). On the other hand, when the terminal (sensor node) (TR) is turned over, since the illuminance sensor (LS1B) receives external light and the illuminance sensor (LS1F) is turned to the wearer side, the illuminance detected by the illuminance sensor (LS1B) becomes larger than the illuminance detected by the illuminance sensor (LS1F).

Incidentally, by comparing the illuminance detected by the illuminance sensor (LS1F) and the illuminance detected by the illuminance sensor (LS1B) by the turn-over detection unit (FBDET), it is detected that the nameplate is tuned over and is not worn correctly. When inside out is detected by the inside out detection unit (FBDET), a loudspeaker (SP) generates an alarm sound to notify the wearer of it.

The microphone (AD) acquires voice information. By the voice information, an environment of the circumference, such as "noisy" or "quiet," can be known. Further, by acquiring and analyzing a voice of a person, face-to-face communication can be analyzed to find its mode: communication is active or dull, the two persons exchange conversation equally or only one person speaks unilaterally, someone is angry or laughing, etc. Further, the face-to-face state that cannot be detected by the infrared ray send/receive device (AB) due to a relation of standing positions of the persons etc. can be supplemented with voice information and acceleration information.

The sounds acquired by the microphone (AD) enable acquisition of both signals of a voice waveform and a signal obtained by integrating it with an integral circuit (AVG). The signal that is integrated represents energy of the acquired sounds.

The triaxial acceleration sensor (AC) detects acceleration of the node, i.e., a movement of the node. Consequently, the system can analyze violence of a movement of the person wearing the terminal (sensor node) (TR) and the behavior of walk etc. from the acceleration data. Further, by comparing values of acceleration detected by plural terminal (sensor node)s, it is possible to analyze activity of communication among persons wearing these terminal (sensor node)s, mutual rhythms, mutual correlation, etc.

In the terminal (sensor node) (TR) of this embodiment, the data acquired with the triaxial acceleration sensor (AC) is stored in the memory unit (STRG) by the sensor data storage control unit (SDCNT), and enables an up and down detection circuit (UDDET) to detect a direction of the nameplate. This uses a fact that regarding the acceleration detected by the triaxial acceleration sensor (AC), two kinds of accelerations: a dynamic acceleration change by a movement of the wearer, and a static acceleration by the gravity acceleration of the earth, are observed.

When the person wears the terminal (sensor node) (TR) on the breast, the display device (LCDD) displays personal information, such as an affiliation of the wearer and his/her name. That is, it acts as a nameplate. On the other hand, if the wearer has the terminal (sensor node) (TR) in the hand and faces the display device (LCDD) to his/her direction, head and tail of the terminal (sensor node) (TR) will become reversed. At this time, the contents displayed on the display device (LCDD) and a function of a button are switched over by an up and down detection signal (UDDET) generated by the up and down detection circuit (UDDET). In this embodiment, an example where information to be displayed on the display device (LCDD) is switched, according to a value of the up and down detection signal (UDDET), between an analysis result by infrared ray activity analysis (ANA) and nameplate display (DNM) that is generated by display control (DISP) is shown.

By the infrared ray send/receive devices (AB) exchanging the infrared rays between the nodes, the system detects whether a terminal (sensor node) (TR) meets other terminal (sensor node) (TR), namely, whether a person wearing one terminal (sensor node) (TR) meets a person wearing other terminal (sensor node) (TR). For this reason, it is desirable that the terminal (sensor node) (TR) is worn on the front part of any person. As described above, the terminal (sensor node) (TR) is further equipped with the sensors including the tri-axial acceleration sensor (AC). A process of the sensing in the terminal (sensor node) (TR) corresponds to organization dynamics data acquisition (A) in FIG. 2A.

In many cases, plural terminal (sensor node)s exist, and constitute a personal area network (PAN) each being connected with a near base station (GW).

A temperature sensor (AE) of the terminal (sensor node) (TR) acquires a temperature of a place where the terminal (sensor node) is located, and the illuminance sensor (LS1F) thereof acquires illuminance in the front direction etc. of the terminal (sensor node) (TR). With these sensors, the terminal (sensor node) can record surrounding environments. For example, based on the temperature and illuminance, the system can also know that the terminal (sensor node) (TR) has moved to somewhere else from a certain place and the like.

As input-output devices corresponding to the person wearing the sensor, the sensor is equipped with buttons 1 to 3 (BTN1 to 3), the display device (LCDD), the loudspeaker (SP), etc.

The memory unit (STRG) is specifically made up of a hard disk drive and the nonvolatile storage device, such as flash memory, and records the terminal information (TRMT) that is a unique identification number of the terminal (sensor node) (TR) and operation setting (TRMA), such as the sensing interval and the contents of an output to the display. In addition, the memory unit (STRG) can temporarily record data and is used to record sensed data.

The communication timing control unit (TRTMG) is a clock that holds the time stamp (GWCSD) and updates the time stamp (GWCSD) at regular intervals. Regarding information of time, the time stamp (GWCSD) is such that the time is corrected periodically by the time stamp (GWCSD) transmitted from the base station (GW) in order to prevent the time stamp (GWCSD) from differing from that of every other terminal (sensor node) (TR).

The sensor data storage control unit (SDCNT) controls the sensing intervals of the sensors etc. and manages the acquired data in accordance with the operation setting (TRMA) recorded in the memory unit (STRG).

The time synchronization corrects the clock by acquiring the time stamp from the base station (GW). The time synchronization may be performed just after associate that will be described later, or may be performed in response to a time synchronous command transmitted from the base station (GW).

When the wireless communication control unit (TRCC) transmits and receives the data, it performs control of a transmission interval and conversion of the data into the data format corresponding to wireless transmission/reception. The wireless communication control (TRCC) may be equipped with a communication function by wire, not by radio, if necessary. The wireless communication control unit (TRCC) can perform congestion control so that its transmission timing may not overlap those of other terminal (sensor node)s (TR's).

An associate (TRTA) transmits/receives the associate request (TRTAQ) for constitution of the personal area network (PAN) with the base station (GW) shown in FIG. 1A and an associate answer (TRTAR), and decides the base station (GW) to which the data should be transmitted. The associate (TRTA) is performed: when a power supply of the terminal (sensor node) (TR) is switched on; and when transmission/reception with the base station (GW) so far being sustained is ceased as a result of translocation of the terminal (sensor node) (TR). As a result of the associate (TRTA), the terminal (sensor node) (TR) is associated with one base station (GW) existing in a near range to which the radio signal from the terminal (sensor node) (TR) reaches.

The send/receive unit (TRSR) is equipped with an antenna and performs transmission and reception of a radio signal. If necessary, the send/receive unit (TRSR) can also perform transmission and reception using a connector for wire communication. Data (TRSRD) sent and received by the send/receive unit (TRSR) is transferred via the personal area network (PAN) between itself and the base station (GW).

FIG. 2A, FIG. 2B, FIG. 2C, and FIG. 2D show an entire flow of the processing performed in the business microscope system of the first embodiment. Although the flow after being divided is shown for the convenience of illustration, respective processings shown in respective figures are performed in the mutually coordinated manner. The figures show a series of flows from the organization dynamics data acquisition (A) by plural terminals (sensor nodes) (TRa, TRb, ..., TRi, and TRj) to an event trigger type analysis unit (F) for analyzing the sensor data.

In this system, the following processings are performed in an appropriate order: the organization dynamics data acquisition (A), the organization dynamics data collection (B), performance input (C), the (D), the analysis result database (E), and the event trigger type analysis unit (F).

First, the organization dynamics data acquisition (A) will be explained using FIG. 2A. A terminal (sensor node) A (TRa) comprises the infrared ray send/receive device (AB), sensors, such as the acceleration sensor (AC), the microphone (AD), and the temperature sensor (AE), and buttons, such as a net value (AFA) button, an awareness (AFB) button, and a thankfulness (AFC) button.

The terminal (sensor node) A (TRa) has a screen (AG) that displays face-to-face information obtained from the infrared ray send/receive device, a user interface (AA) through which a rating as subjective evaluation is inputted, and, although illustration is omitted, a microcomputer, and a wireless transmission function.

The acceleration sensor (AC) detects the acceleration of the terminal (sensor node) A (TRa) (namely, an acceleration of a person A wearing the terminal (sensor node) A (TRa) (illustration is omitted)). The infrared ray send/receive device (AB) detects the face-to-face state of the terminal (sensor node) A (TRa) (namely, a state in which the terminal (sensor node) A (TRa) faces the other terminal (sensor node)). Incidentally, that the terminal (sensor node) A (TRa) faces the other terminal (sensor node) indicates that the person A wearing the terminal (sensor node) A (TRa) faces a person wearing the other terminal (sensor node). The microphone (AD) detects sounds around the terminal (sensor node) A (TRa), and the temperature sensor (AE) detects a temperature around the terminal (sensor node) A (TRa).

A button (AF) is a tool by which an input is conducted from a subjective viewpoint of the person A (illustration is omitted) wearing the terminal (sensor node) A (TRa), who presses a button of the net value (AFA) when conducting a main business, presses a button of awareness when a new idea etc. is found, and presses a button of thankfulness when thanking a member for something.

The system of this embodiment has plural terminal (sensor node)s (the terminal (sensor node)s A (TRa) to J (TRj) of FIG. 2A). The each terminal (sensor node) is installed to one person, respectively. For example, the terminal (sensor node) A (TRa) is installed to the person A, and the terminal (sensor node) B (TRb) is installed to a person B (illustration is omitted). This is in order that the relationship property between persons is analyzed and further that performance of the organization is shown in the figure.

The terminal (sensor node)s B (TRb) to J (TRj), like the terminal (sensor node) A (TRa), have each sensors, a microcomputer, and a wireless transmission function. In the following explanation, when an explanation that corresponds to any of the terminal (sensor node) A (TRa) to the terminal (sensor node) J (TRj) is given, and when it is not necessary to particularly discriminate these terminal (sensor node)s, they are described as the terminal (sensor node) (TR).

Each terminal (sensor node) (TR) always (or repeatedly in shot intervals) performs the sensing with the sensors. Then, the each terminal (sensor node) (TR) transmits the acquired data (sensing data) by radio at the predetermined intervals. The interval at which the data is transmitted may be the same as the sensing interval, or may be a larger interval than the sensing interval. The data transmitted at this time is given a time when the sensing is performed and a unique identification (ID) of the terminal (sensor node) (TR) that performed the sensing. That wireless transmission of data is performed collectively is because a usable sate of the terminal (sensor node) (TR) is sustained for a long time while a person wears it by suppressing power consumption by transmission. Moreover, it is desirable for subsequent analysis that the same sensing interval is set up in all the terminal (sensor node)s (TR's).

The performance input (C) is a processing of inputting a value expressing performance. Incidentally, performance is a subjective or objective evaluation that is determined based on a certain standard. For example, a person who wears the terminal (sensor node) (TR) inputs a value of the subjective evaluation (performance) based on a certain standard, such as a degree of attainment of a business at that time point, a degree of contribution to the organization, a degree of satisfaction, etc. The predetermined timing may be one time in a few hours, one time in a day, or at a time point when an event of a meeting etc. ends. It is possible for the person wearing the terminal (sensor node) (TR) to input a value of performance by operating the terminal (sensor node) (TR), or operating a personal computer (PC) such as the client (CL). Alternatively, values that were filled in by hand writing may be collectively inputted into the PC later.

This embodiment shows an example where the terminal (sensor node) can input performance of Social, Intellectual, Spiritual, Physical, and Executive as subjective evaluations. The inputted performance values are used in the analysis processing. Meaning of each question is as follows: Social means "Did you successfully build up rich human relations (cooperation and sympathy)?", Intellectual means "Did you successfully perform what you should do?", Spiritual means "Did you successfully feel worth doing in the work? Did you successfully feel a sense of fulfillment?", Physical means "Did you successfully care the body (rest, nutrition, and exercise)?", and Executive means "Did you successfully gain a new wisdom (awareness, knowledge)?"

The performance about the organization may be calculated from the performance of an individual. Objective data such as sales and costs and data that is already converted into a numeral such as questionnaire results of customers may be inputted periodically as the performance. In the case where a numerical value is automatically acquired like a generation rate of error etc. in production control and the like, the acquired numerical value may be automatically inputted as a value of the performance. Further, an economic index, such as gross national product (GNP), can be inputted. These are stored into the general information table (ASIP).

The data transmitted from the each terminal (sensor node) (TR) by radio is collected in the organization dynamics data collection (B), and is stored in the database. The data table (BA) stores the sensor data obtained from the terminal (sensor node) (TR).

In the table (BA), user ID (BAA) stores a user's identifier, acquisition time (BAB) does a time when the terminal (sensor node) (TR) received the data, base station (BAC) does a base station that the terminal (sensor node) (TR) received, acceleration sensor (BAD) does the sensor data of the acceleration sensor (AC), Infrared ray sensor (BAE) does the sensor data of the infrared ray send/receive device (AB), sound sensor (BAF) does the sensor data of the microphone (AD), temperature (BAG) does the sensor data of the temperature sensor (AE), awareness (BAH) does existence/absence (yes/no) of pressing of the thankfulness (AFC) button, thankfulness (BAI) does existence/absence (yes/no) of pressing of the awareness (AFB) button, and net value (BAJ) does existence/absence (yes/no) of pressing of the net value (AFA) button.

The performance table (BB) stores values of performance inputted in the performance input (C) and the subjectivity evaluation input (AA).

In the table (BB), user ID (BBA) stores an identifier of the user, and acquisition time (BBB) stores a time when subjective evaluation is inputted (AA) into the terminal (sensor node) (TR) or a time when performance is inputted (C) thereinto. Social (BBC), Intellectual (BBD), Spiritual (BBE), Physical (BBF), and Executive (BBG) are contents of subjectivity evaluation.

Moreover, in the dynamics data collection (B), since the data is stored in the order of data arrival to the dynamics data collection (B), the data is not necessarily stored in the time order. Moreover, the data table (BA) and the performance table (BB) are one example, and a table may be formed for each sensor data.

Figure 2B:
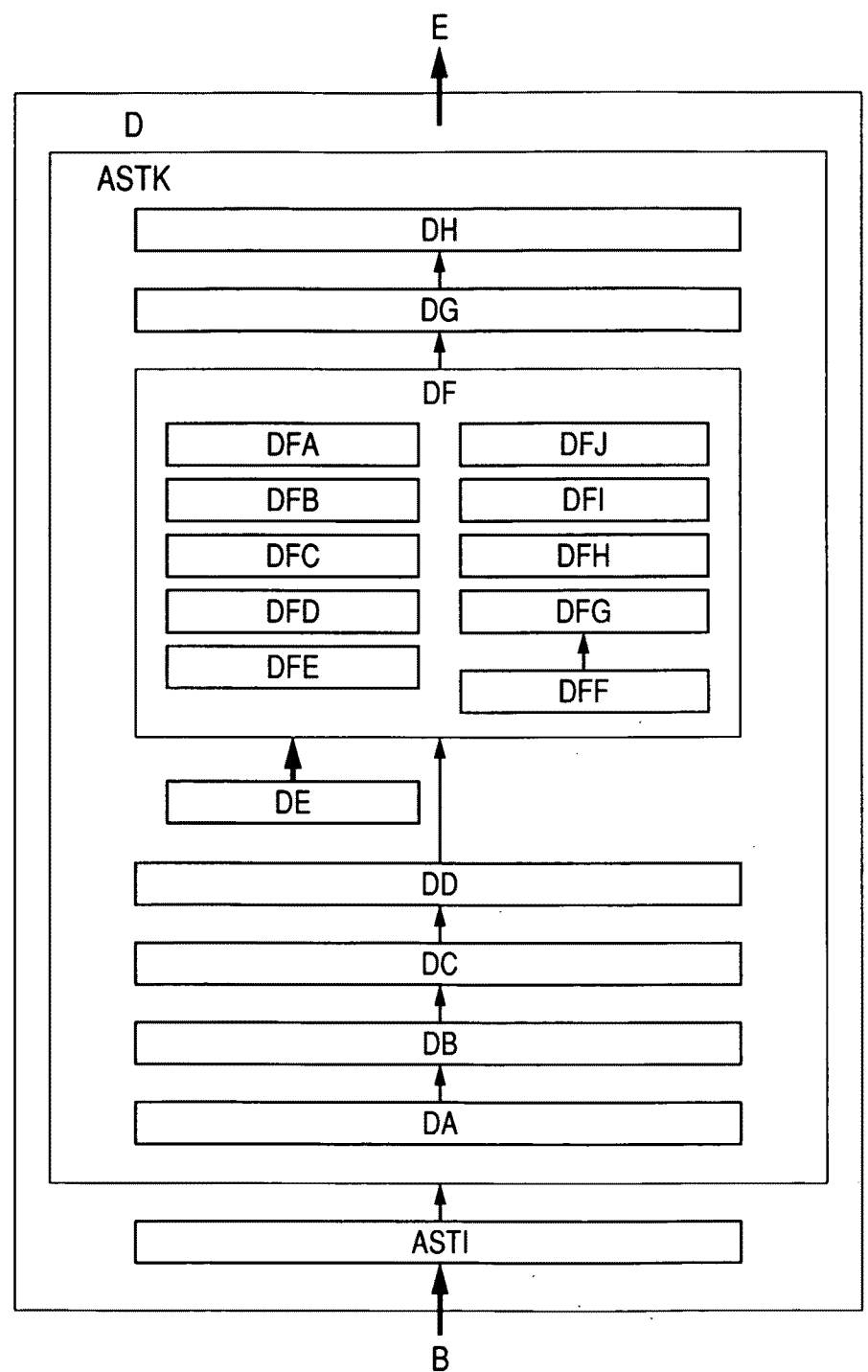
FIG. 2B is a schematic diagram (No. 2) of the whole of the first embodiment.

The time trigger analysis unit (D) shown in FIG. 2B is activated at fixed time intervals to perform the analysis. The time trigger analysis unit (D) performs the analysis based on the data obtained by the organization dynamics data collection (B), and stores results analyzed by the time trigger analysis unit (D) into the analysis result database (E).

The time trigger analysis unit (D) comprise the time analysis (ASTK) that uses the timer (ASTI).

Regarding the timer (ASTI), a time is set up, and the timer is so configured that, when it becomes that time, the time analysis (ASTK) may be activated.

The time analysis (ASTK) comprises user information and time range information acquisition (DA), data acquisition (DB), rearranging in the chronological order (DC), division in predetermined duration (DD), analysis reference data (DE), movement judgment in predetermined duration (DF), movement judgment in frame length (DG), and storage data (DH), is activated to perform the analysis processing in response to an activation command from the timer (ASTI).

The user information and time range information acquisition (DA) acquires the user on whom the time range analysis is performed and the time range in which the analysis is performed from the analysis conditions (ASMJ).

The data acquisition (DB) acquires the data from the organization dynamics data collection (B) based on the user and time range that were selected by the user information and time range information acquisition (DA).

Further, the organization dynamics data collection (B) is such that the data is not stored in the time order. Therefore, it is necessary to scan the whole of the organization dynamics data collection (B) to acquire the data used in the analysis processing from the organization dynamics data collection (B). However, it takes a longer time to scan the organization dynamics data collection (B) as the amount of data thereof becomes larger. Then, if it is known in which part of the organization dynamics data collection (B) the pertinent sensor data is stored, the range is specified and the sensor data in the range is acquired, whereby it becomes possible to acquire the sensor data without spending much time.

For example, provided that according to the method for calculating a range specification, 60 pieces of data per hour for each user are collected in the organization dynamics data collection (B) and that the number of users is ten, 600 pieces of data in one hour are stored in the organization dynamics data collection (B). Therefore, in the case where newly acquired sensor data is added to the lowermost line of the organization dynamics data collection (B), if the time range to be analyzed is from the present time to one hour before, what is necessary is just to acquire pieces of the data ranging from the first to 600th lines when counting from the lowermost line. Moreover, for pieces of the data ranging from two hours before to three hours before, what is necessary is just to acquire pieces of the data ranging from the 1201st to 1800th lines when counting from the lowermost line.

The rearranging in the chronological order (DC) performs rearranging of the data in the time order for each user. The division in predetermined duration (DD) performs division so that a time width after the division may match a time width when storing it into the analysis result database (E).

Further, there may be a case where the time width suited to the analysis processing differs from the time width when the sensor data is stored into the analysis result database (E). In that case, the data of the time width when the data is stored into the analysis result database (E) is divided again so as to be equivalent to the time width suited to the analysis. This is called a frame. For example, in the case where the time width when the data is stored into the analysis result database (E) is 5 minutes and the time width suited to the analysis processing is 20 seconds, the time width of 5 minutes is divided so that the number of frames becomes 15.

This time width suited to the analysis processing and the time width when the data is stored into the analysis result database (E) are described in the analysis conditions (ASMJ). Analysis reference data (DE) stores reference data needed for identification of the movement judgment in frame length. In the movement judgment in frame length (DF), it is determined which movement is being conducted by comparing the movement in the frame length with this analysis reference data (DE). This analysis reference data (DE) is stored in the analysis parameter (ASMP).

The movement judgment in frame length (DF) performs the analysis based on the data obtained by the organization dynamics data collection (B). In this movement judgment, area detection (DFA), face-to-face detection (DFB), movement detection (DFC), temperature detection (DFD), awareness detection (DFE), thankfulness detection (DFJ), net value detection (DFI), performance (DFH), self/other detection (DFG), and voice/non-voice detection (DFF) are performed. A program, coefficients, etc. needed for analysis are stored in the analysis algorithm (ASMA) or the analysis parameter (ASMP).

The area detection (DFA) specifies an area using the base station (BAC) of the data table (BA). The analysis reference data (DE) includes reference data that indicates area information of the base station. By referring to this, the area is detected.

The face-to-face detection (DFB) detects whom the person in concern faces using the Infrared ray sensor (BAE) of the data table (BA). The analysis reference data (DE) includes reference data of the user ID and the name. By referring to this, it is detected whom the person in concern faces.

The movement detection (DFC) detects the movement using the acceleration sensor (BAD) of the data table (BA). The feature quantity is obtained from the acceleration sensor (BAD), and the movement is detected by comparing the feature quantity and the movement reference data stored in the analysis reference data (DE).

The temperature detection (DFD) detects a temperature using the temperature (BAG) of the data table (BA). Since the temperature (BAG) is a value obtained from the sensor, it is not in a degree Celsius. Therefore, it is converted into a degree Celsius.

The awareness detection (DFE) detects existence as to whether the awareness is detected in a specified time using the awareness (BAH) of the data table (BA).

When the thankfulness detection (DFJ) detects existence of thankfulness in the specified time using the thankfulness (BAI) of the data table (BA), it records the existence of the thankfulness and a name of the talking partner if it detected. The face-to-face detection (DFB) can be used in specifying the talking partner.

The net value detection (DFI) records whether net value is detected in a specified time using the net value (BAJ) of the data table (BA).

The performance (DFH) detects whether performance is detected in a specified time using the performance table (BB) and records it.

The voice/non-voice detection (DFF) discriminates voices and non-voices using the sound sensor (BAF) of the data table (BA). By finding the feature quantity from the sound sensor (BAF) and then comparing the feature quantity with voice and non-voice reference data stored in the analysis reference data (DE), detection as to whether the sound is a voice or a non-voice is performed.

The self/other detection (DFG) performs discrimination as to whether the sound is a voice of him-/herself or a voice of other people using a sound sensor of the data table (BA). The system uses a sound that was discriminated as a voice by the voice/non-voice detection (DFF). By finding the feature quantity from the sound sensor (BAF) and then comparing the feature quantity with self/other voice reference data stored in the analysis reference data (DE), a detection as to whether the voice is a voice of his-/herself or a voice of other people is performed.

The movement judgment in predetermined duration (DG) is a processing of merging the result of the movement judgment in frame length (DF) with the time width. A majority of the results in the time width is found and a result of the larger value is decided as the in-time-width movement judgment (DG). For example, if there are 30 frames in the time width, a result of most frequently occurring movements is regarded as a result of that time. The result may be represented by a value ranging from 0 to 1 by dividing the number of identification results by the number of frames in the time width.

The data storing (DH) is such that a result analyzed with the time width by the in-time-width movement judgment (DG) is stored into the analysis result database (E).

Figure 2C:
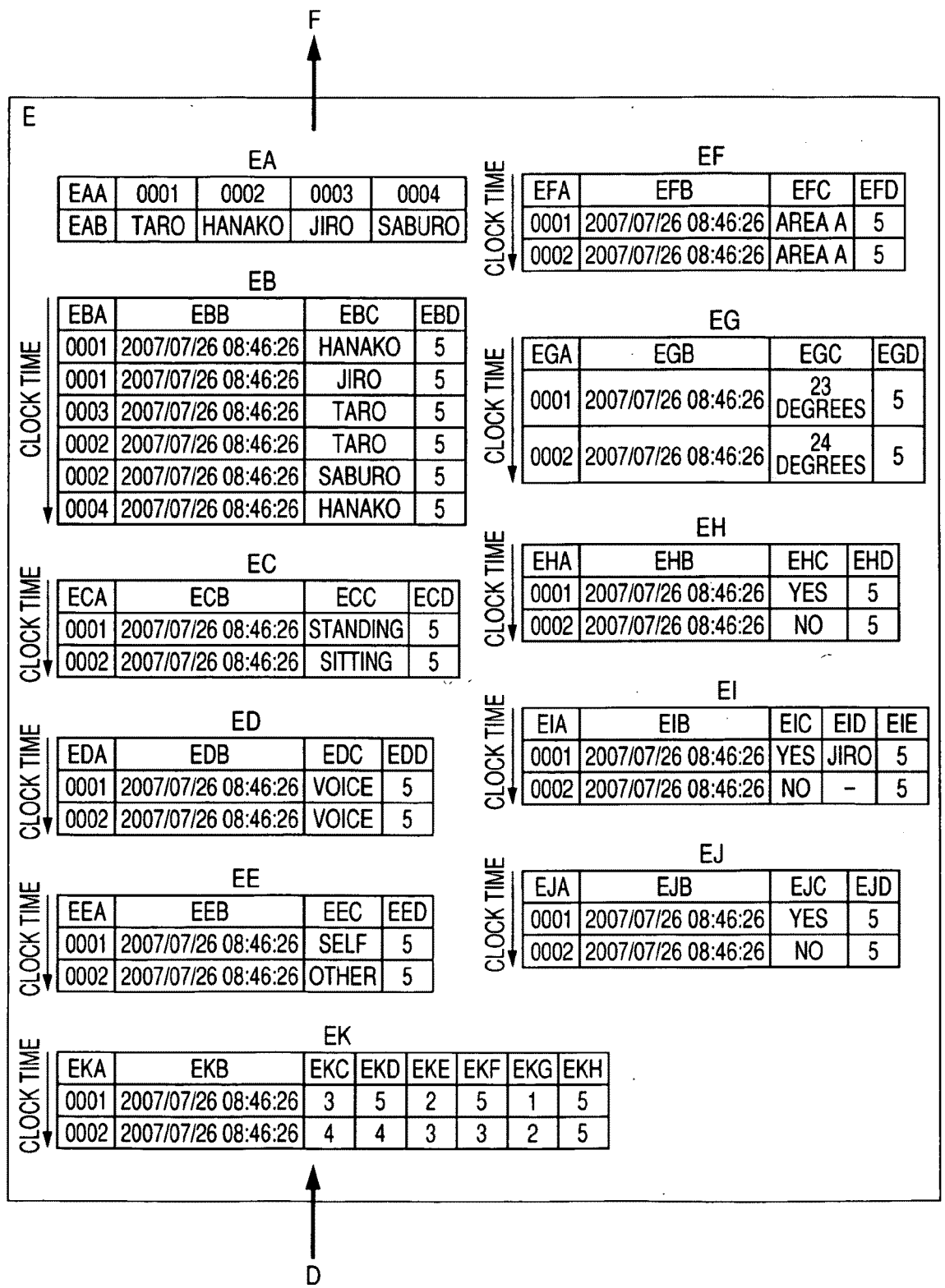
FIG. 2C is a schematic diagram (No. 3) of the whole of the first embodiment.

The analysis result database (E) shown in FIG. 2C is a database that stores the analysis results of the time trigger analysis unit (D) in the chronological order.

A user information table (EA) is a table that stored user ID (EAA) and name (EAB).

A face-to-face information table (EB) is a table that stored results of the face-to-face detection (DFB). In the table (EB), user ID (EBA) indicates a user that became the object of the analysis, data acquisition start time (EBB) does an acquisition time (a time when acquisition started) of the sensor data used in the analysis, talking partner (EBC) does a person whom the person in concern faces, and time width (EBD) does a time width used in the analysis starting from the data acquisition start time (EBB).

An movement information table (EC) is a table that stored the results of the movement detection (DFC). In the table (EC), user ID (ECA) indicates a user that became the object of the analysis, acquisition start time (ECB) does an acquisition time (a time when acquisition started) of the sensor data used in the analysis, movement (ECC) does an analysis result, and time width (ECD) does a time width used in the analysis starting from the acquisition start time (ECB).

A voice/non-voice information table (ED) is a table that stored results of the voice/non-voice detection (DFF). In the table (ED), user ID (EDA) indicates a user that became a object of the analysis, acquisition start time (EDB) does an acquisition time (a time when acquisition started) of the sensor data used in the analysis, voice/non-voice (EDC) does an analysis result, and time width (EDD) does a time width used in the analysis starting from the acquisition start time (EDB).

A self/other information table (EE) is a table that stored results of the self/other detection (DFG). In the table (EE), user ID (EEA) indicates a user that became the object of the analysis, acquisition start time (EEB) does an acquisition time (a time when acquisition started) of the sensor data used in the analysis, self/other (EEC) does an analysis result, and time width (EED) does a time width used in the analysis starting from the acquisition start time (EEB).

An area (place) information table (EF) is a table that stored results of the area detection (DFA). In the table (EF), user ID (EFA) indicates a user that became the object of the analysis, acquisition start time (EFB) does an acquisition time (a time when acquisition started) of the sensor data used in the analysis, area (place) (EFC) does an analysis result, and time width (EFD) does a time width used in the analysis starting from the acquisition start time (EFB).

A temperature information table (EG) is a table that stored results of the area detection (DFA). In the table (EG), user ID (EGA) indicates a user that became the object of the analysis, acquisition start time (EGB) does an acquisition time (a time when acquisition started) of the sensor data used in the analysis, temperature (EGC) does an analysis result, and time width (EGD) does a time width used in the analysis starting from the acquisition start time (EGB).

An awareness information table (EH) is a table that stored results of the awareness detection (DFE). In the table (EH), user ID (EHA) indicates a user that became the object of the analysis, acquisition start time (EHB) indicates an acquisition time (a time when acquisition started) of the sensor data used in the analysis, awareness (EHC) is an analysis result, and time width (EHD) is a time width used in the analysis starting from the acquisition start time (EHB).

A thankfulness information table (EI) is a table that stored results of the thankfulness detection (DFJ). User ID (EIA) indicates a user that became the object of the analysis, acquisition start time (EIB) indicates an acquisition time of the sensor data (a time when acquisition started), thankfulness (EIC) indicates an analysis result, talking partner (EID) indicates a talking partner whom the person in concern thanked, and time width (EIE) indicates a time width used in the analysis starting from the acquisition start time (EIB).

A net value information table (EJ) is a table that stored a result of the net value detection (DFI). User ID (EJA) indicates the object that became the object of the analysis, acquisition start time (EJB) is an acquisition time (a time when acquisition started) of the sensor data used in the analysis, net value (EJC) is an analysis result, and time width (EJD) is a time width used in the analysis starting from the acquisition start time (EJB).

A performance information table (EK) is a table that stores results of the performance (DFH). User ID (EKA) indicates a user that became the object of the analysis, acquisition start time (EKB) does an acquisition time (a time when acquisition started) of the sensor data used in the analysis, Social (EKC), Intellectual (EKD), Spiritual (EKE) Physical (EKF), and Executive (EKG) do analysis results, and time width (EKH) does a time width used in the analysis starting from the acquisition start time (EKB).

Figure 2D:
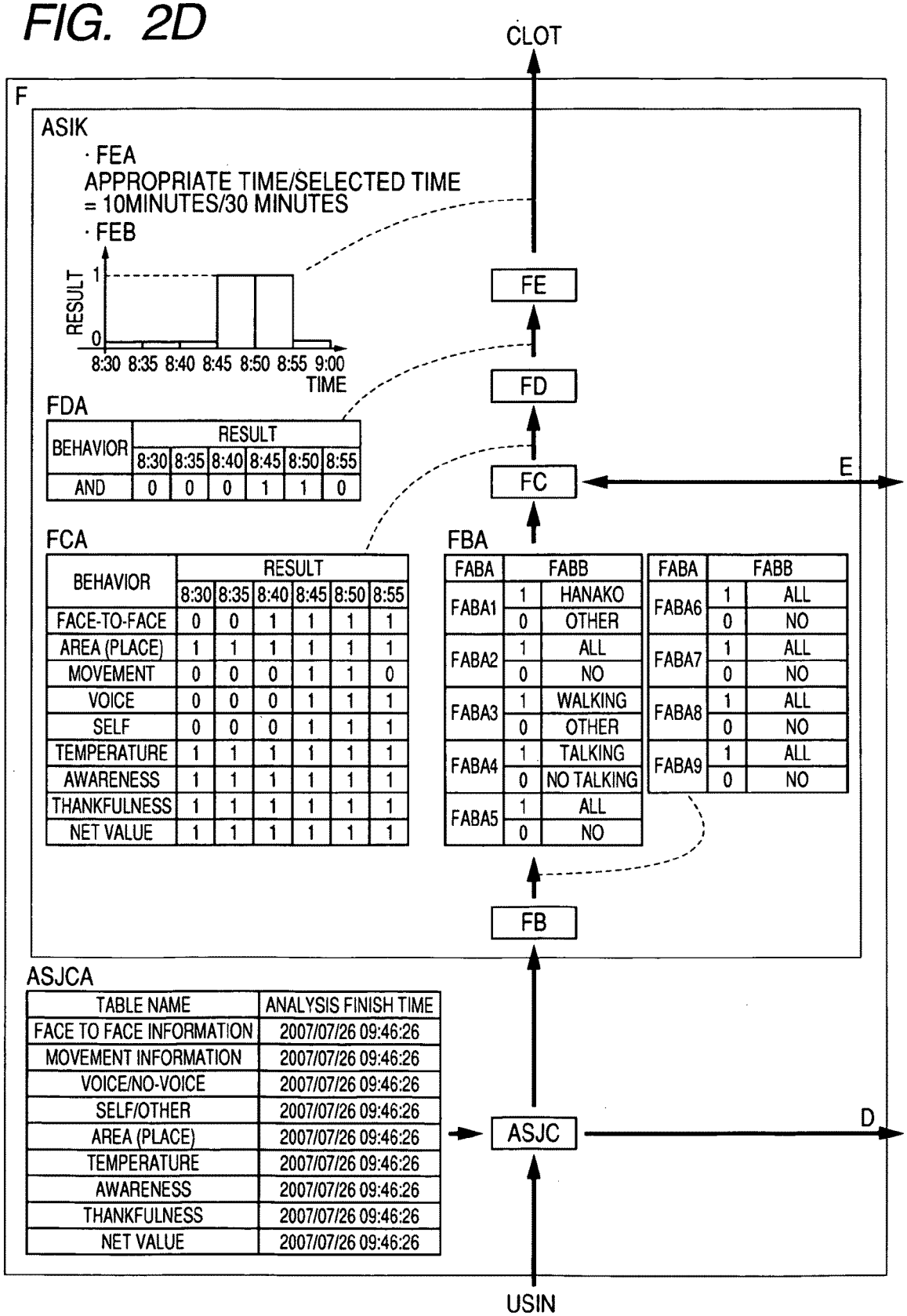
FIG. 2D is a schematic diagram (No. 4) of the whole of the first embodiment.

The event trigger type analysis unit (F) shown in FIG. 2D is activated by an input (USIN) and performs the analysis. It performs the analysis based on the data obtained in the analysis result database (E) and outputs the analyzed result (CLOT) in the event trigger type analysis unit (F).

The event trigger type analysis unit (F) comprises analysis time range check (ASJC) and the event analysis (ASIK).

The input (USIN) is information that comes from the reader who wishes to visualize. For example, it is an input "a time during 8:30 to 9:00 on July 26 when Taro meets and talks with Hanako while the both are walking."

The analysis time range check (ASJC) compares a time needed for the analysis of the input (USIN) and the analysis finish range table (ASJCA). If information outside the rage described in the analysis finish range table (ASJCA) becomes needed, an analysis request is made to the time trigger analysis unit (D). If being written within the range, the flow proceeds to the next step.

The event analysis (ASIK) comprises 5W1H interpretation (FB), binarization (FC), integration processing (FD), and processing (FE). It accesses the analysis result database (E) after the analysis time range check (ASJC), and performs the analysis processing using the result.

The 5W1H interpretation (FB) converts the input (USIN) into individual movements that are stored in the analysis result database (E), and creates a judgment database (FBA) so that, for the behaviors, a pertinent behavior is set to 1 and other behaviors are set to 0. The judgment database (FBA) comprises a behavior (FABA) and a result (FABB). Then, a result for each behavior (FABA) is substituted into the judgment database (FBA).

For example, consider an example of the input (USIN) that "during 8:30 to 9:00 on July 26, a time when Taro meets and talks to Hanako while the both walking." Regarding face-to-face (FABA1), with Taro placed at a center, a time when Taro faces Hanako is set to 1, and other times are set to 0. Since there is no specification in area (FABA2), all analysis results are set to 1. In movement (FABA3), a walking time is set to 1 and the others are set to 0. In voice (FABA4), a time when talking to someone is set to 1, and the others are set to 0. Since there is no specification in self (FABA5) as to who talks to the oneself, all analysis results are set to 1. Since there is no specification in temperature (FABA6), all analysis results are set to 1. Since there is no specification in awareness (FABA7), all analysis results are set to 1. Since there is no specification in thankfulness (FABA8), all analysis results are set to 1. Since there is no specification in net value (FABA9), all analysis results are set to 1.

The binarization (FC) acquires the data that is used for the visualization from the analysis result database (E), and performs the binarization using the judgment database (FBA).

An example of the binarization is shown in a binarization table (FCA). A value of 1 or 0 is substituted for each time width after seeing how classification of the binarization stored in a judgment database (FBA) is done.

Moreover, in substituting all behaviors into the binarization table, desirably the substitution is so conducted that they may match to the time width shown in the analysis result database and the behaviors are at the same time when the binarization table (FCA) is viewed vertically.

The integration processing (FD) is a processing of integrating the binarization tables (FCA's) that are output results of the binarization (FC). Since any analysis results that are at the same time when the binarization table (FCA) is viewed vertically and that have individual requests in the input (USIN) are set to 1, the analysis result corresponding to the request of the input (USIN) becomes 1 by performing an AND processing. AND processing is a processing that if all the elements in a vertical column are 1, its output is set to 1. In addition to this, there are an OR processing, an XOR processing, etc.

The processing (FE) performs the visualization of a result of the integration processing (FD), such as a diagram, a number, etc. It processes an integrated table (FDA) into a form that is easy for the reader to understand by converting it into a bar graph (bar graph conversion (FEB) or by numeric conversion (calculation (FEA)). Then, this result is outputted (CLOT).

Figure 3A:
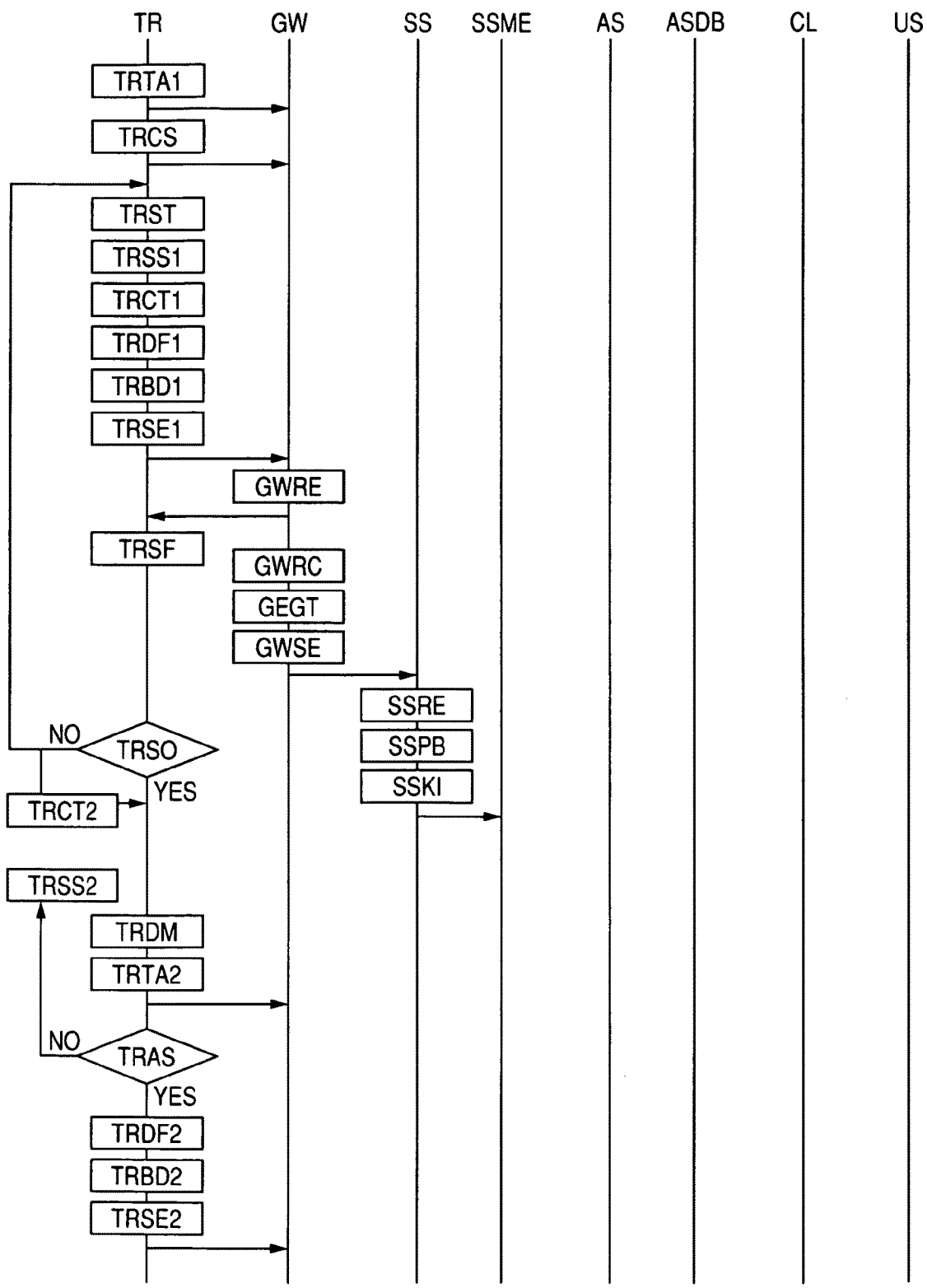
FIG. 3A is a sequence diagram (No. 1) of the first embodiment.
Figure 3B:
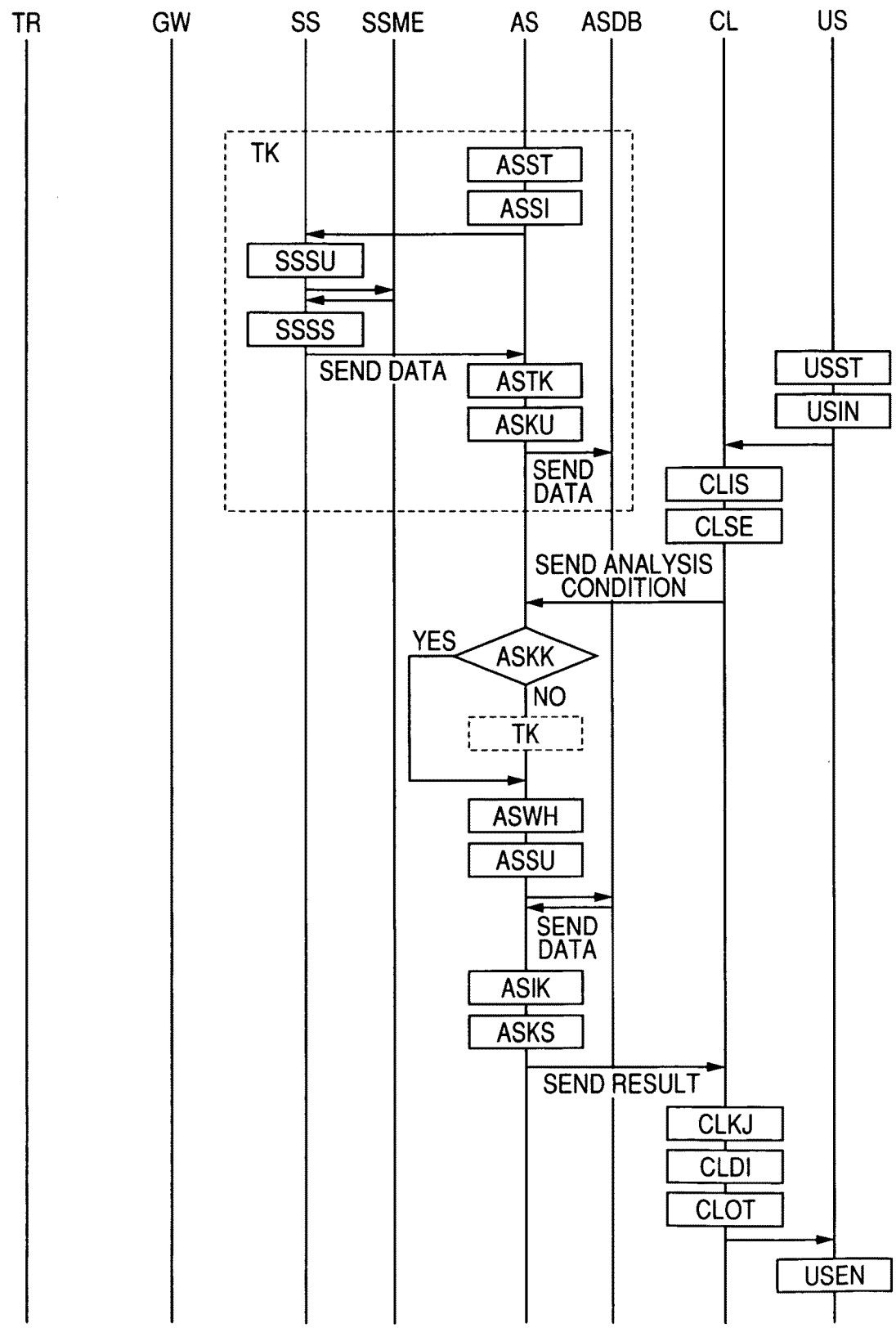
FIG. 3B is a sequence diagram (No. 2) of the first embodiment.

FIG. 3A and FIG. 3B are sequence diagrams showing a procedure of processing that is performed in this embodiment and that displays the relationship property between persons in the organization based on the data acquired by the terminal (TR). Although the sequence is divided for the convenience of illustration, the processing shown in the figures is performed in the mutually coordinated manner.

First, when a power supply of the terminal (TR) is turned on and the terminal (TR) is not in an associate state with the base station (GW), the terminal (TR) performs associate (TRTA1). The associate means a sate in which the terminal (TR) is in a relation of communicating with a certain one base station (GW). By deciding the transmission destination of the data by means of the associate, the terminal (TR) can transmit the data surely.

When the associate succeeded, the terminal (TR) performs time synchronization (TRCS) next. In the time synchronization (TRCS), the terminal (TR) receives the time data from the base station (GW), and sets up a clock (TRCK) in the terminal (TR). The base station (GW) is correcting its time by connecting periodically with the ntp server (TS). Consequently, the time is synchronized in all the terminals (TR's). As a result, by checking on the time stamp accompanying with the data, it becomes possible to analyze mutual body expressions or exchange of voice information in communication between persons.

The sensor data storage control unit (SDCNT) is timer-activated (TRST) at fixed time intervals, for example, every ten seconds, and senses the acceleration, the sounds, the temperature, the illuminance, etc. (TRSS1). The terminal (TR) detects the face-to-face state by transmitting/receiving the terminal ID between itself and other terminal (TR) by the infrared ray. The sensor data storage control unit (SDCNT) may always perform the sensing without being timer-activated (TRST). However, by activating it at fixed time intervals, the power supply can be used efficiently and the terminal (TR) can continue to be used without being charged for a long time.

The terminal (TR) adds the time stamp and the terminal information (TRMT) of the clock (TRCK) and the terminal information (TRMT) to the data that was sensed (TRCT1). A person wearing the terminal (TR) is identified by the terminal information (TRMT).

The sensing (TRSS1) and the terminal information-time stamp addition (TRCT1) correspond to the organization dynamics data acquisition (A) of FIG. 1.

On the other hand, the each person wearing the each terminal (TR) inputs a value of performance via the terminal (TR) or the client (CL). The inputted value is recorded in the sensor net server (SS). In the case where the index of the whole organization, such as sales or a stock price, is used as performance, a representative may input a value collectively, or when those indices are updated, a value of an updated index may be inputted automatically.

In data format conversion (TRDF1), the terminal (TR) converts the sensed data and the sensing conditions into a fixed wireless transmission format. The converted data is transmitted to the base station (GW) after that.

When transmitting a large amount of continuous data, the terminal (TR) restricts the number of pieces of the data to be sent at one time by data division (TRBD1). As a result, a risk of data suffering a loss lowers.

Data transmission (TRSE1) transmits data to the base station (GW) that is under the associate from the send/receive unit (TRSR) in adherence to a wireless transmission standard.

When the base station (GW) receives (GWRE) the data from the terminal (TR), it will send back a answer to the terminal (TR). The terminal (TR) that received the answer judges that transmission finish (TRSF) is attained.

When the transmission completion (TRSF) is not received even after a fixed time (namely, when the terminal (TR) receives no answer), the terminal (TR) judges that the base station is data transmission impossible (TRSO). In this case, the data is stored into the terminal (TR), and when a transmission state is established again, it will be transmitted collectively. This scheme makes it possible to acquire the data without being cut off even when the person wearing the terminal (TR) moved to a palace where radio does not access, or when the data is no longer received by a fault of the base station (GW). This can find a statistical character of the organization stably.

A procedure of such collective sending of the data will be explained. The terminal (TR) stores the data that was not able to be transmitted (TRDM) and requests the associate again (TRTA2). Here, when a answer is obtained from the base station (GW) and the associate is successful (TRAS), the terminal (TR) performs data format conversion (TRDF2), data division (TRBD2), and data transmission (TRSE2). These processings are the same as the data format conversion (TRDF1), the data division (TRBD1), and the data transmission (TRSE1), respectively. In the data transmission (TRSE2), congestion is controlled so that radio waves may not collide with each other. After that, the terminal (TR) returns to a normal processing.

When the associate is not successful, the terminal (TR) performs sensing (TRSS2) and terminal information and time stamp attachment (TRCT2) periodically until the associate succeeds. The sensing (TRSS2) and the terminal information and time stamp attachment (TRCT2) are the same processings as the sensing (TRSS1) and the terminal information-time stamp addition (TRCT1), respectively. The data acquired by these processings is stored in the terminal (TR) until the transmission to the base station (GW) succeeds.

When the data is divided, the base station (GW) joins the divided data in continuous data by integrating data (GWRC). Further, the base station (GW) gives the data (GWRC) the base station information (GWMG) that is a number unique to the base station, and sends (GWSE) the data via a network (NW). The base station information (GWMG) can be used as information designating a rough position of the terminal (TR) at that time.

When the sensor net server (SS) receives the data from a base station (SSRE), it will classify the received data into elements of time, terminal information, acceleration, infrared ray, temperature, etc. (SSPB) in the data management (SSDA). This classification is conducted by referring to a format currently recorded as the data format information (SSMF). The classified pieces of the data are stored in suitable column (row) of a record (line) of a database (SSKI). Storing the data corresponding to the same time into the same record enables searching with respect to the time and the terminal information (TRMT). At this time, if necessary, a table may be formed for the each terminal information (TRMT).

The processing so far described corresponds to the organization dynamics data collection (B) of FIG. 2A.

FIG. 3B is a sequence diagram showing a procedure of performing the analysis using the data table (BA) stored in the sensor net server (SS). The application server (AS) is activated (ASST) periodically to perform time analysis (TK).

A section in which the analysis is performed is decided and a data acquisition request (ASSI) of the range is conducted to the sensor net server (SS).

In data acquisition (SSSU), the needed sensor data is acquired from a memory unit (SSNE) in the sensor net server. Data transmission (SSSS) transmits the acquired sensor data to the application server (AS).

The time analysis (ASTK) analyzes the acquired sensor data. Storing (ASKU) stores a result of the time analysis (ASTK) into the analysis result database (E). Further, in order to express that it has been already analyzed, the analysis finish range table (ASJCA) is updated.

The client user (US) activates (USST) the system to start the analysis and inputs desired conditions into it (USIN).

The client (CL) conducts the analysis condition setting (CLIS) in accordance with the input conditions that were inputted (USIN). In analysis condition transmission (CLSE), the analysis condition setting (CLIS) is transmitted to the application server (AS).

In analysis finish check (ASKK), check as to whether all needed data is prepared is performed by comparing the analysis condition setting (CLIS) and the analysis finish range table (ASJCA). If the data is insufficient, the time analysis (TK) will be performed.

When the needed data is prepared, the analysis condition setting (CLIS) is decomposed into each element according to 5W1H (ASWH). Then, the needed information is acquired by a data request (ASSU).

In the event analysis (ASIK), the analysis is performed based on the sensor signals acquired by the data request (ASSU).

In result transmission (ASKS), a result of the event analysis (ASIK) is transmitted to the client (CL).

The client (CL) receives the result of the result transmission (ASKS) (result reception (CLKJ)), displays this (CLDI), and outputs it to an output device (CLOT).

The user (US) checks the displayed analysis result and terminates the analysis (USEN).

Even in the case the analysis is performed on a large amount of the sensor data in order to obtain an analysis result that the reader wished to have by controlling the event trigger type analysis and the time trigger analysis, it becomes possible to output the result instantaneously. Then, it is realized to output instantaneously a result desired by the reader without making the reader feel stress.

Second Embodiment

In the first embodiment, the control method of the event trigger type analysis and the time trigger analysis for the purpose of instantaneously outputting the result that the reader desired without making the reader feel stress was described. In this embodiment, it becomes possible to perform the visualization by a presentation method different from that of the first embodiment by replacing parts of the details of the time trigger analysis unit (D) and the event trigger type analysis unit (F). Therefore, since only parts of the time trigger analysis unit (D) and the event trigger type analysis unit (F) differ from those of the first embodiment, these parts will be described below.

Figure 4:
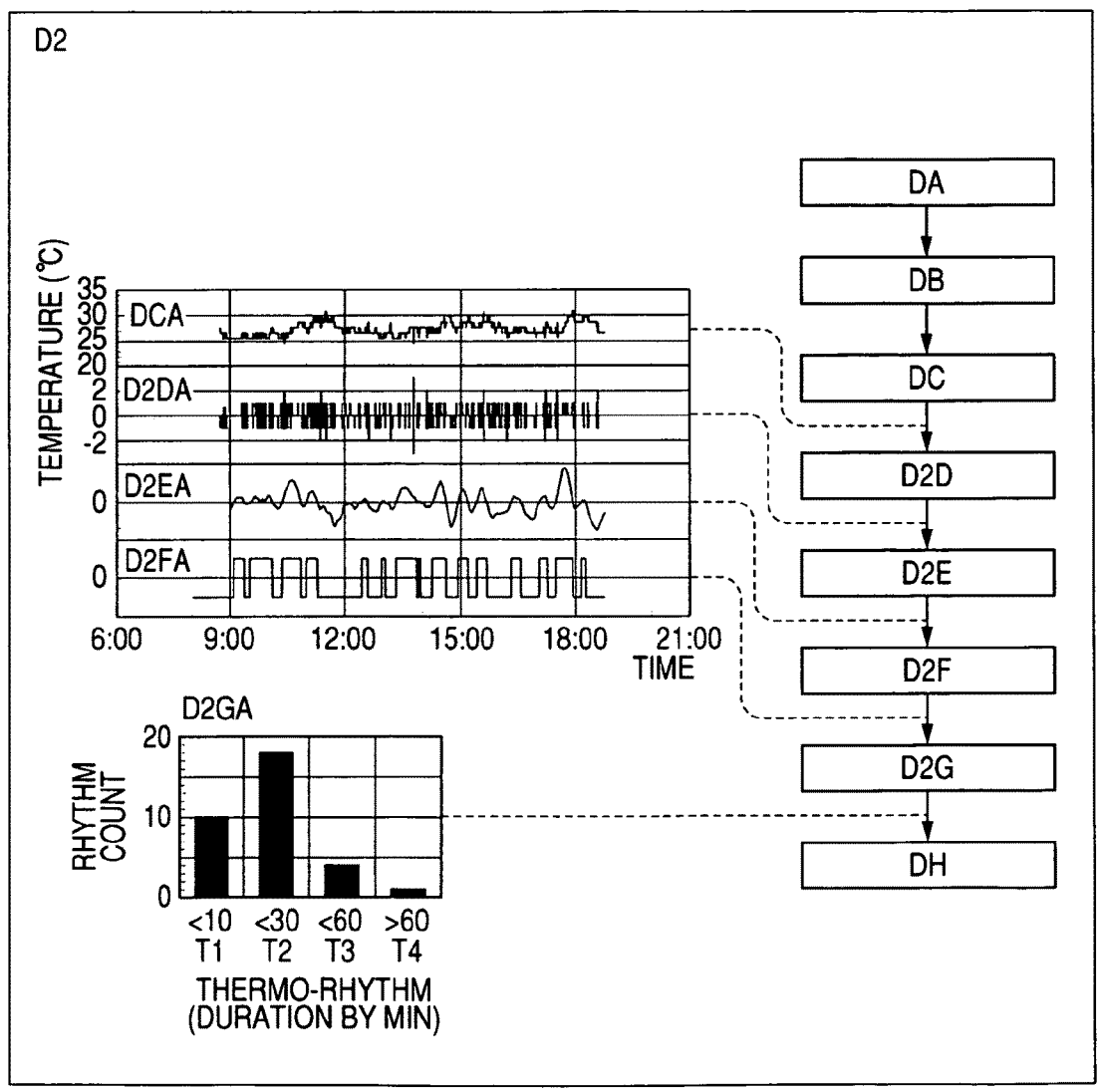
FIG. 4 is a schematic diagram of a time trigger analysis unit in the schematic diagram of the whole of a second embodiment.

FIG. 4 is a diagram showing a time trigger analysis unit (D2) in the second embodiment. Parts from a difference (delta) (D2D) to a histogram (D2G) that are parts different from those of the time trigger analysis unit (D) in the first embodiment will be described.

The difference (delta) (D2D) obtains a difference between certain data and data earlier by one that are rearranged in the time order by rearranging in the chronological order (DC). In FIG. 4, (DCA) is a temperature graph in which the data is arranged in the time order in the same FIG. 4, and (D2DA) in the figure is graphing of a difference of the temperature data.

A low pass filter (D2E) provides low pass filtering on a result of the difference (delta) (D2D). FIG. (D2EA) is a graph showing the data after applying the low pass filter.

In binarization (D2F), a positive value is set to 1 and a negative value is set to 0 for the results of the low pass filter (D2E). In the same FIG. 4, (D2FA) is a graph showing the data after applying binarization.

The histogram (D2G) is a graph of the number of zero cross values counted in a fixed time for the results of the binarization (D2F). In the same FIG. 4, (D2GA) is a histogram, in which zero-cross counts are specified to be four classifications (less than 10, less than 30, less than 60, and 60 or more).

Figure 5:
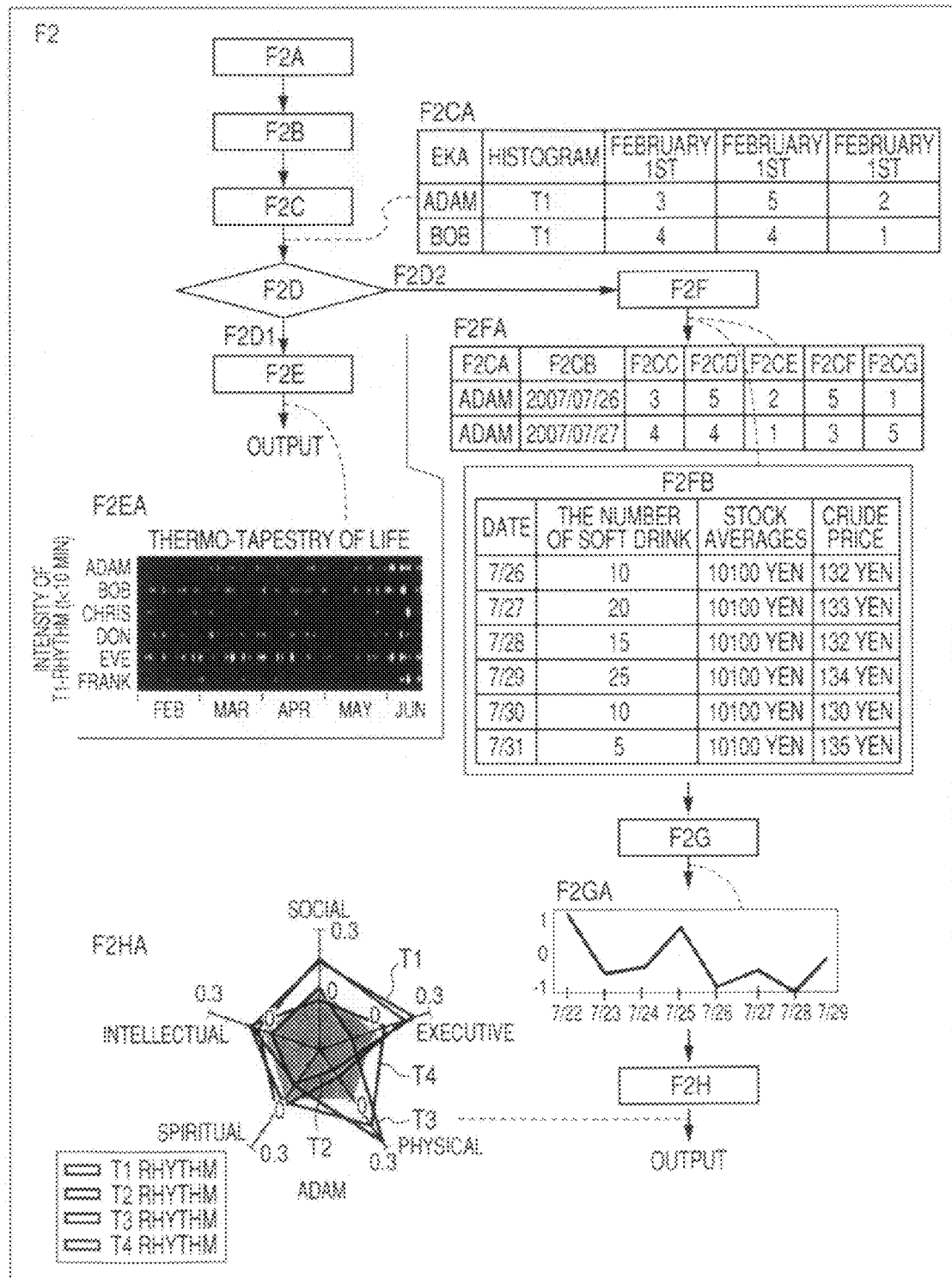
FIG. 5 is a schematic diagram of an event trigger type analysis unit in the schematic diagram of the whole of the second embodiment.

FIG. 5 is an event trigger type analysis unit (F2) in the second embodiment.

User information and time range information acquisition (F2A) specifies a user and a time that are used for the visualization.

Regarding the analysis width adjustment (F2B), if the time width of an output of the time trigger analysis unit (D2) differs from the time width used in the event trigger type analysis unit (F2), the both widths must be matched. In doing this, the time width is adjusted to one that is used in the event trigger type analysis unit (F2). For example, one may enumerate a case where, if the time width of the event trigger type analysis unit (F2) is one day and the time width of the time trigger analysis unit (D2) is one hour, a value outputted from the time width of the time trigger analysis unit (D2) is summed up for a duration of 24 hours, and the like.

Tabulation (F2C) in the chronological order creates a table adjusted for the user and its analysis width. FIG. (F2CA) is an example of the table, in which histograms of one day are stored for each user.

Image selection (F2E) selects an image for the visualization. Image type 1 (F2D1) is a line chart, and image type 2 (F2D1) is a radar chart.

Graphing (F2E) displays a result of the tabulation (F2C) in the chronological order by a line chart. Figure (F2EA) is an example of a graph shown by the line chart.

Data reading (F2F) that becomes a comparison object reads the data that becomes an object of comparison. In doing this, preferably pieces of data used for comparison are data of the same time and the time widths are the same. If the time widths differ, the time width is set to one that is used in the event trigger type analysis unit (F2).

A table (F2FA) is the performance data (BB), and the general information table (ASIP) also shall be the comparison object. In this embodiment, (F2FB) in the figure is illustrated as this general information table (ASIP), in which a sale of beverage of each day, an average stock price, an oil price, etc. are accumulated as indices. By using these indices for the analysis together with the sensor data, tendency of a place that is being sensed is found.

The correlation (F2G) finds correlation between the data and the comparison object. This process obtains the correlation between the behavior and the data that became the comparison object. FIG. (F2GA) is graphing of the correlation coefficient with a line chart.

Chart creation (F2H) is a result of the visualization with a radar chart in order to make the result of the correlation (F2G) easy to understand. A correlation between the comparison object data (user subjectivity, sales, etc.) and the sensor data is obtained.

In this embodiment, the visualization with an expression method different from that of the first embodiment is performed by replacing parts of the details of the time trigger analysis unit (D) and the event trigger type analysis unit (F).

Third Embodiment

In the third embodiment, like the second embodiment, parts of the details of the time trigger analysis unit (D) and the event trigger type analysis unit (F) are replaced, whereby it becomes possible to realize the visualization by a mode of expression different from those of the first embodiment and the second embodiment. Since only parts of the time trigger analysis unit (D) and the event trigger type analysis unit (F) differ from counterparts of the two units of the third embodiment, only these parts will be described below.

Figure 6:
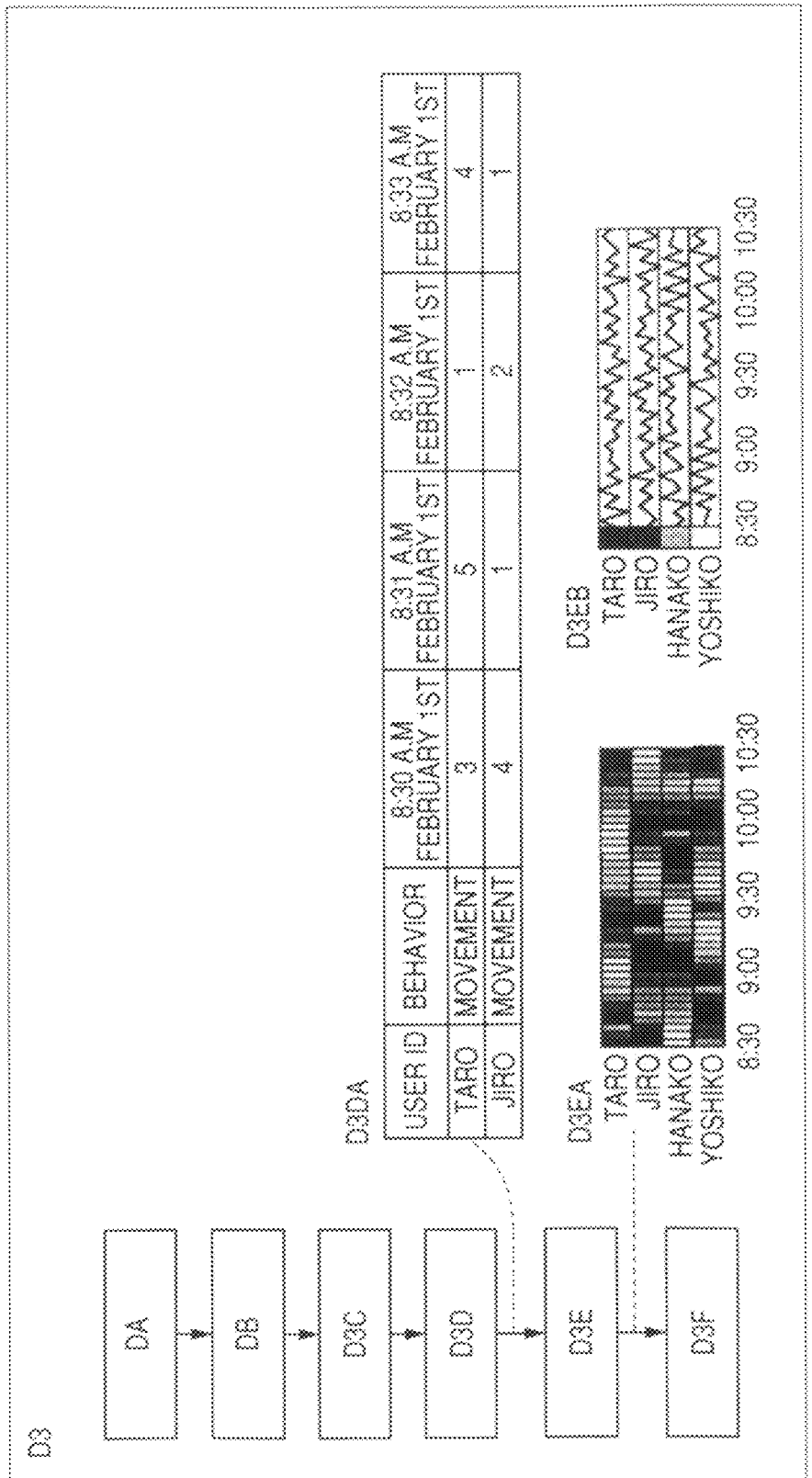
FIG. 6 is a schematic diagram of the time trigger analysis unit in the schematic diagram of the whole of a third embodiment.

FIG. 6 is a time trigger analysis unit (D3). Analysis (D3C) to data storage (D3F) that are different parts from those of the time trigger analysis unit (D) will be described.

The analysis (D3C) indicates processings from the rearranging in the chronological order (DC) to the in-time-width movement judgment (DG) in the time trigger analysis unit (D).

The tabulation (D3F) creates a table based on the results of the analysis (D3C). FIG. (D3DA) represents movements of Taro and Jiro in ten steps, showing high values as the movement becomes strenuous. The time width is set to one minute.

Imaging (D3E) creates an image using the results of the tabulation (D3D). The image includes a graph, such as in FIG. (D3EB) in which the magnitude of a value is judged with the concentration of a color and a graph, such as in FIG. (D3EB), in which the values are represented in a line graph. As an example, the representation is configured as follows: as the data has a strenuous movement, the data is represented with more highly colors in FIG. (D3EA), and with higher values in FIG. (D3EB).

The data storage (D3F) stores an image outputted by the imaging (D3E) into the analysis result database (E).

Figure 7:
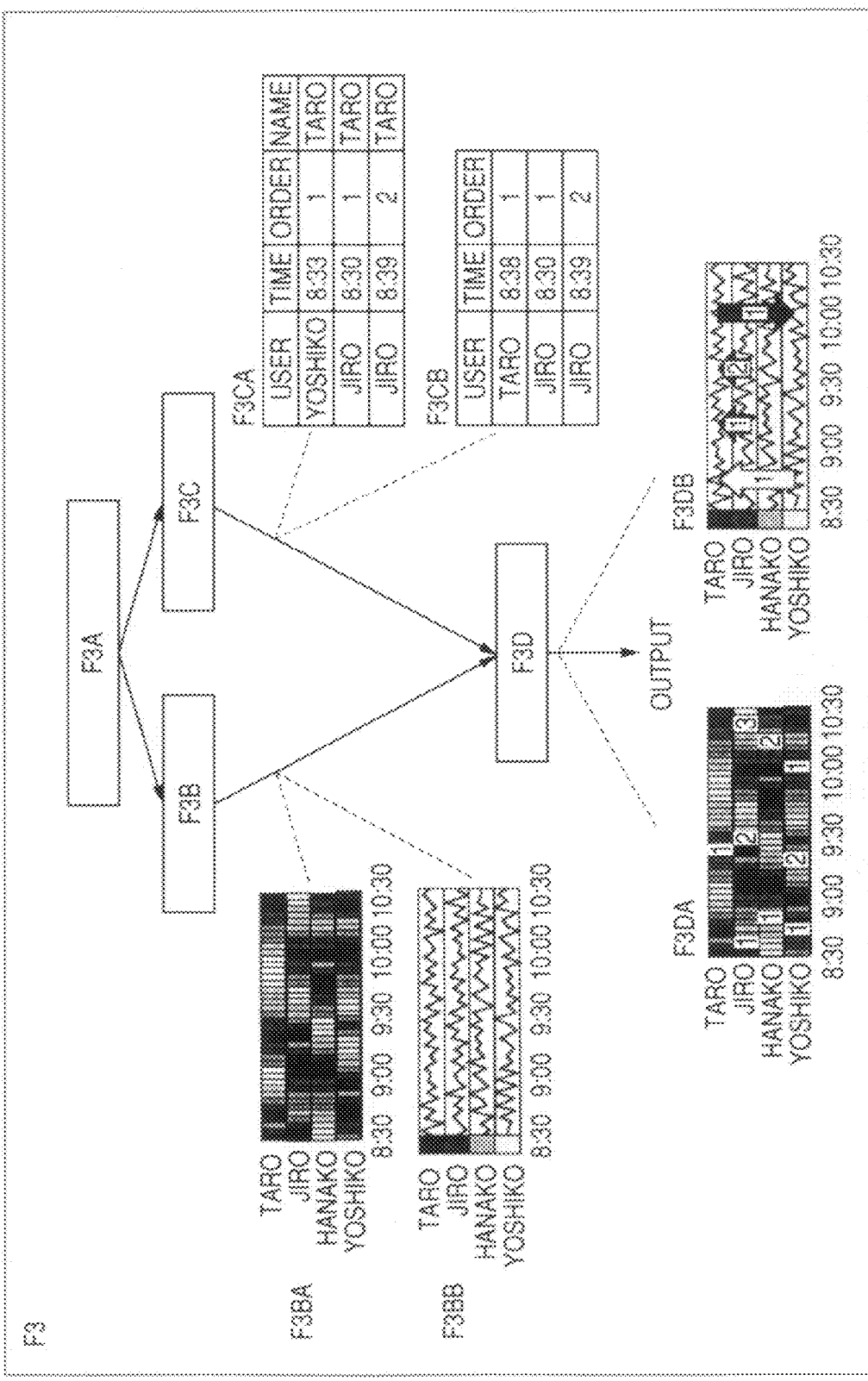
FIG. 7 is a schematic diagram of the event trigger type analysis unit in the schematic diagram of the whole of the third embodiment.

FIG. 7 is an event trigger type analysis unit (F3).

User information and time range information acquisition (F3A) specifies the user and the time that are used for the visualization.

Image reading (F3B) reads an image created by the time trigger analysis unit (D3). If the time range specified by the user information and time range information acquisition (F3A) differs from the time range of the analysis result database (E), images stored in the analysis result database (E) are lined up side by side in a time series, and are treated as one sheet of image.

Table reading (F3C) reads a corresponding item by the analysis result database (E). Then, in the case of a thankfulness table (F3CA), a sequence of thankfulness is assigned to the data in the chronological order within the range in which the user information and time range information acquisition (F3A) is specified. In a similar manner, regarding awareness, a sequence of awareness is assigned to the data in the chronological order. How to assign the sequence can be assignment for each user or that for each group.

An integration processing (F3D) is a processing of combining the image reading (F3B) and the table reading (F3C). In this processing, a sequence (number) is marked on a time point for a pertinent user of the table reading (F3C) based on the image reading (F3B). Further, when there is the talking partner, it is desirable that both the user and the talking partner are marked with arrows. FIG. (F3DA) is a diagram in which the sequence (number) is marked on the time; FIG. (F3DB) is a diagram in which the user and the talking partner is marked on the time with the arrows.

In this embodiment, the visualization by an expression method different from that of the first embodiment is performed by replacing parts of the details of the time trigger analysis unit (D) and the event trigger type analysis unit (F).

As described above, according to each embodiment of the present invention, even if there is a large amount of the sensor data, it becomes possible to provide the visualization result to the reader instantaneously. That is, it becomes possible to output the result instantaneously that the reader desires, without making the reader feel stress.

What is claimed is:

1. An analysis system that analyzes sensor data, the analysis system comprising:

a sensor node that senses the sensor data, a server connected with the sensor node via a network, and a base station connected with the sensor node and the server via the network, wherein the sensor node and the server each have a send/receive unit, a memory unit, and a control unit, wherein the sensor node performs an association with the base station, receives time data from the base station upon associating with the base station, sets a clock within the sensor node based on the time data to time synchronize with the base station, and adds a time stamp to each sensor data, wherein the memory unit of the server stores the sensor data received via the network, wherein the control unit of the server rearranges the sensor data in the chronological order when the sensor data that arrived later has an earlier order of being sensed than the sensor data that arrived earlier so that the sensor data sensed earlier may take an earlier order than the sensor data sensed later, and stores it into the memory unit, wherein the server performs an analysis related to the sensor data using the sensor data that was rearranged in the chronological order of sensing and outputs a performed result, wherein the analysis comprises by including time trigger analysis of analyzing the sensor data at every predetermined time and event trigger type analysis of analyzing the sensor data in response to an event input using the event input as a trigger, wherein the control unit of the server switches between the time trigger analysis and the event trigger type analysis according to input conditions inputted into the server, and wherein the event trigger type analysis processes and outputs an analysis result obtained by the time trigger.

2. The analysis system according to claim 1, wherein the base station has a send/receive unit, a memory unit, and a control unit, wherein the sensor node, when being in a possible range of wireless communication, transmits the sensor data to the base station via the send/receive unit, and when not being in the possible range of wireless communication, stores the sensor data in the memory unit of the sensor node, and wherein the server receives the sensor data via the base station.

3. The analysis system according to claim 1, wherein, when rearranging the sensor data in the chronological order of the sensing, the control unit of the server specifies a range of the sensor data that is considered as an object of the rearranging with respect to the sensor data before being rearranged.

4. The analysis system according to claim 1, wherein the control unit of the server finds tendency of a place that is being sensed by the sensor node by analyzing the sensor data using an index.

5. The analysis system according to claim 1, wherein the control unit of the server corrects a center position of the amplitude of the sensor data using a low pass filter.

6. The analysis system according to claim 1, wherein the server calculates a histogram of the sensor data as a feature quantity indicating tendency of the sensor data in a predetermined time.

7. An analysis system for analyzing sensor data, the analysis system comprising:
a sensor node that senses the sensor data, a server connected with the sensor node via a network, and a base station connected with the sensor node and the server via the network,
wherein the sensor node and the server each have a send/receive unit, a memory unit, and a control unit,
wherein the sensor node performs an association with the base station, receives time data from the base station upon associating with the base station, sets a clock within the sensor node based on the time data to time synchronize with the base station, and adds a time stamp to each sensor data,
wherein the server selectively performs at least either of event trigger type analysis of performing the analysis in response to an event input using the event input as a trigger or time trigger analysis of performing the analysis at every predetermined time on the sensor data received via the network depending according to input conditions, and
wherein the event trigger type analysis processes and outputs an analysis result obtained by the time trigger.

8. The analysis system according to claim 7, wherein the base station has a send/receive unit, a memory unit, and a control unit,
wherein the sensor node transmits the acquired sensor data to the base station when the base station is located in a range in which wireless communication is possible, and stores the sensor data that was acquired for the base station into the memory unit of the sensor node when the base station is not located in the range in which wireless communication is possible, and
wherein the server receives the sensor data via the base station.

9. The analysis system according to claim 7, wherein the control unit of the server changes the order of the sensor data arrived earlier and the sensor data arrived later, so that the sensor data is rearranged in the chronological order of sensing in the time trigger analysis.

10. The analysis system according to claim 7, wherein the server performs the analysis on the sensor data that was rearranged in the chronological order of sensing in the event trigger type analysis as the object.

11. The analysis system according to claim 7, wherein the control unit of the server, when rearranging the sensor data in the chronological order of sensing, specifies a range of the sensor data that is considered as an object of the rearranging with respect to the sensor data before being rearranged.

12. An analysis server that is connected with a sensor node and a base station via a network, the sensor ode being connected with the base station via the network, the analysis server comprising:
a send/receive unit, a memory unit, and a control unit,
wherein the memory unit is configured to store the sensor data received via the network, each sensor data including a time stamp added by the sensor node based on a clock within the sensor node that is time synchronized with the base station by way of the sensor node setting the clock according to time data that is received by the sensor node from the base station upon the sensor node performing an association with the base station,
wherein the control unit is configured to, when the sensor data that arrived later has an earlier order of being sensed than the sensor data that arrived later, rearrange the sensor data in the chronological order so that the sensor data sensed earlier may take an earlier order than the sensor data sensed later, and to store it into the memory unit, and
wherein the analysis server thus performs an analysis related to the sensor data using the sensor data that was rearranged in the chronological order of sensing,
wherein the analysis comprises by including time trigger analysis of analyzing the sensor data at every predetermined time and event trigger type analysis of analyzing the sensor data in response to an event input using the event input as a trigger,
wherein the control unit of the analysis server switches between the time rigger analysis and the event trigger type analysis according to input conditions inputted into the analysis server, and
wherein the event trigger type analysis processes and outputs an analysis result obtained by the time trigger.

13. The analysis server according to claim 12, wherein, when rearranging the sensor data in the chronological order of the sensing, the control unit specifies a range of the sensor data that is considered as the object of the rearranging with respect to the sensor data before being rearranged.

14. The analysis server according to claim 12, wherein the control unit finds tendency of a place that is being sensed by the sensor node by analyzing the sensor data using an index.

15. The analysis server according to claim 12, wherein the control unit calculates a histogram of the sensor data as a feature quantity indicating tendency of the sensor data in a predetermined time.

16. The analysis server according to claim 12, wherein the sensor node comprise a plurality of unit sensor nodes, and wherein the analysis server receives the sensor data transmitted from the plurality of unit sensor nodes in arrival order, rearranges the sensor data that was aligned in arrival order into a time series sequence of the sensing in the whole of the plurality of unit sensor nodes, and performs the analysis on the sensor data that is rearranged as the object.

17. The analysis server according to claim 12, wherein the sensor node comprise a single unit sensor node, and wherein the analysis server receives the sensor data transmitted from the single unit sensor node, rearranges the sensor data that was aligned in arrival order into a time series sequence of the sensing in the single unit sensor node, and performs the analysis on the sensor data that was rearranged as the object.

18. The analysis server according to claim 12, wherein the analysis server is configured to store a result obtained by performing the analysis into the memory unit as a plurality of analysis result tables, and wherein the plurality of analysis result tables are stored being aligned in the chronological order that corresponds to a time series of the sensing of the sensor data related to the analysis.

* * * * *